(12) United States Patent
Tashiro

(10) Patent No.: US 8,395,850 B2
(45) Date of Patent: Mar. 12, 2013

(54) ZOOM LENS AND IMAGE PICKUP APPARATUS HAVING THE SAME

(75) Inventor: Yoshihisa Tashiro, Nikko (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/112,231

(22) Filed: May 20, 2011

(65) Prior Publication Data

US 2011/0222165 A1   Sep. 15, 2011

Related U.S. Application Data

(63) Continuation of application No. 12/776,466, filed on May 10, 2010, now Pat. No. 8,208,205.

(30) Foreign Application Priority Data

May 9, 2009  (JP) ................................. 2009-114059
Feb. 19, 2010  (JP) ................................. 2010-035248

(51) Int. Cl.
*G02B 15/14*   (2006.01)
(52) U.S. Cl. ...................................... 359/691
(58) Field of Classification Search .................. 359/680, 359/682, 686, 689, 691
See application file for complete search history.

(56) References Cited

U.S. PATENT DOCUMENTS

| | | | |
|---|---|---|---|
| 6,972,908 B2 | 12/2005 | Noda | |
| 7,382,551 B2 | 6/2008 | Sekita | |
| 7,471,459 B2 | 12/2008 | Hankawa et al. | |
| 7,474,472 B2 | 1/2009 | Hozumi et al. | |
| 7,652,826 B2 | 1/2010 | Katakura | |
| 2009/0284642 A1 | 11/2009 | Ichikawa | |

FOREIGN PATENT DOCUMENTS

| | | |
|---|---|---|
| JP | 10-274739 A | 10/1998 |
| JP | 2005-148435 A | 6/2005 |
| JP | 2005-274662 A | 10/2005 |
| JP | 2005-274663 A | 10/2005 |
| JP | 2007-133133 A | 5/2007 |
| JP | 2007-293368 A | 11/2007 |
| JP | 2007-327991 A | 12/2007 |
| JP | 2009-20324 A | 1/2009 |

*Primary Examiner* — Darryl J Collins
(74) *Attorney, Agent, or Firm* — Rossi, Kimms & McDowell LLP

(57) ABSTRACT

A zoom lens comprises a first lens group having a negative refractive power and a second lens group having a positive refractive power in order from object to image sides, an interval between the first and second lens groups changes in a zoom operation, the first lens group is constituted by negative and positive lenses in order from the object to image sides, the negative and positive lenses of the first lens group are arranged at intervals, the second lens group is constituted by three lenses including positive and negative lenses in order from the object to image sides, and a radius of curvature of a lens surface at the object side of the negative lens constituting the first lens group, a shape of a negative lens having the maximum refractive power constituting the second lens group, and a refractive power of the second lens group are appropriately set.

1 Claim, 21 Drawing Sheets

ZOOM LENS AND IMAGE PICKUP APPARATUS HAVING THE SAME

CROSS REFERENCE TO RELATED APPLICATION

This is a continuation of U.S. patent application Ser. No. 12/776,466 filed 10 May, 2010, the entire content of which is herein incorporated by reference.

BACKGROUND OF THE INVENTION

1. Field of the Invention

The present invention relates to a zoom lens and an image pickup apparatus having the same, and is suitable for a digital camera, a video camera, a silver salt film camera, a TV camera, or the like.

2. Description of the Related Art

An image pickup apparatus such as a video camera or a digital still camera using a solid-state image pickup element needs to be small as a whole and to have a high performance. Further, an image pickup optical system used for the image pickup apparatus needs to be a small-sized zoom lens having a high optical performance in which a zoom ratio is around three times.

A negative-lead type two group zoom lens which is constituted by a first lens group having a negative refractive power and a second lens group having a positive refractive power in order from an object side to an image side and performs a zooming operation by changing an interval of each lens group is known.

For example, a zoom lens that is a negative-lead type two group zoom lens having a zoom ratio of around three times and that the first lens having the negative refractive power is constituted by two lenses and the second lens group having the positive refractive power is constituted by three lenses is known (Japanese Patent Laid-open No. 2007-293368).

Further, a zoom lens where the first lens group having the negative refractive power is constituted by two lenses and the second lens group having the positive refractive power is constituted by two lenses is known (Japanese Patent Laid-open No. 2005-148435).

Since the negative-lead type two group zoom lens has an asymmetric lens configuration, various kinds of aberrations caused by the asymmetry of the lens configuration such as a field curvature and a coma aberration are easily generated. In particular, when the size of a whole lens system is reduced and a zoom ratio is greater, the asymmetry is greater and it is difficult to correct these various kinds of aberrations.

Because a zoom lens disclosed in Japanese Patent Laid-open No. 2007-293368 has a meniscus shape where a concave surface of a negative lens of a first lens group faces an image side and a lens effective diameter is easily increased, a whole of the first lens group is thickened and the size of a whole lens tends to be larger.

A zoom lens disclosed in Japanese Patent Laid-open No. 2005-148435 uses an aspherical surface whose displacement from a spherical surface is large as a negative lens constituting a second lens group to correct the various kinds of aberrations. The negative lens has a lens shape where aberrations are exchanged by a lens surface at the object side and a lens surface at the image side to cancel the aberrations each other to make a whole balance with regard to components of the coma aberrations or the field curvature. Therefore, if a lens surface of the negative lens is decentered, the balance for cancelling the aberration is lost and the optical performance tends to be greatly deteriorated.

Commonly, in the negative-lead type two group zoom lens, in order to reduce a whole size and to ensure a predetermined zoom ratio to obtain a high optical performance, it is important that the lens configuration of the first lens group having a negative refractive power and the second lens group having a positive refractive power is appropriately formed.

In particular, in order to correct the field curvature and the coma aberration in a whole zoom range and to reduce the size of a whole optical system, it is important that a shape of the first lens surface arranged closest to the object side of the first lens group and a shape of a negative lens of the second lens group are appropriately formed.

BRIEF SUMMARY OF THE INVENTION

The present invention provides a small-sized zoom lens which corrects a various kind of aberrations well and has a superior optical performance and an image pickup apparatus having the same.

A zoom lens as one aspect of the present invention comprises a first lens group having a negative refractive power and a second lens group having a positive refractive power in order from an object side to an image side. An interval between the first lens group and the second lens group is configured to be changed in a zoom operation. The first lens group is constituted by a negative lens and a positive lens in order from the object side to the image side. The negative lens and the positive lens of the first lens group are arranged at intervals. The second lens group is constituted by three lenses including a positive lens and a negative lens in order from the object side to the image side. The following conditional expressions are satisfied, where R1na is a radius of curvature of a lens surface at the object side of the negative lens which constitutes the first lens group, R2na is a radius of curvature of a lens surface at the object side of a negative lens having the maximum refractive power which constitutes the second lens group, R2nb is a radius of curvature of a lens surface at the image side of a negative lens having the maximum refractive power which constitutes the second lens group, f2 is a focal length of the second lens group, and fw is a focal length at a wide-angle end in a whole lens system.

$$-24.0 < R1na/fw < -1.0$$

$$0.2 < (R2na+R2nb)/(R2na-R2nb) < 2.2$$

$$1.2 < f2/fw < 1.8$$

An image pickup apparatus as another aspect of the present invention comprises the zoom lens and an image pickup element configured to receive light of an image formed by the zoom lens.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

A zoom lens in each embodiment of the present invention is constituted by a first lens group having a negative refractive power and a second lens group having a positive refractive power in order from an object side to an image side, and both of them move so that an interval between the first lens group and the second lens group is changed in a zooming operation (in a magnification varying operation). The first lens group is constituted by a negative lens and a positive lens in order from the object side to the image side, and the negative lens and the positive lens of the first lens group are arranged at intervals. The second lens group is constituted by three lenses including a positive lens and a negative lens in order from the object side to the image side.

However, with regard to a cemented lens, each cemented lens is counted as one. An aspherical lens (a compound aspherical lens) which is obtained by forming a resin on a surface of a spherical lens is counted as one lens.

Figure 1:
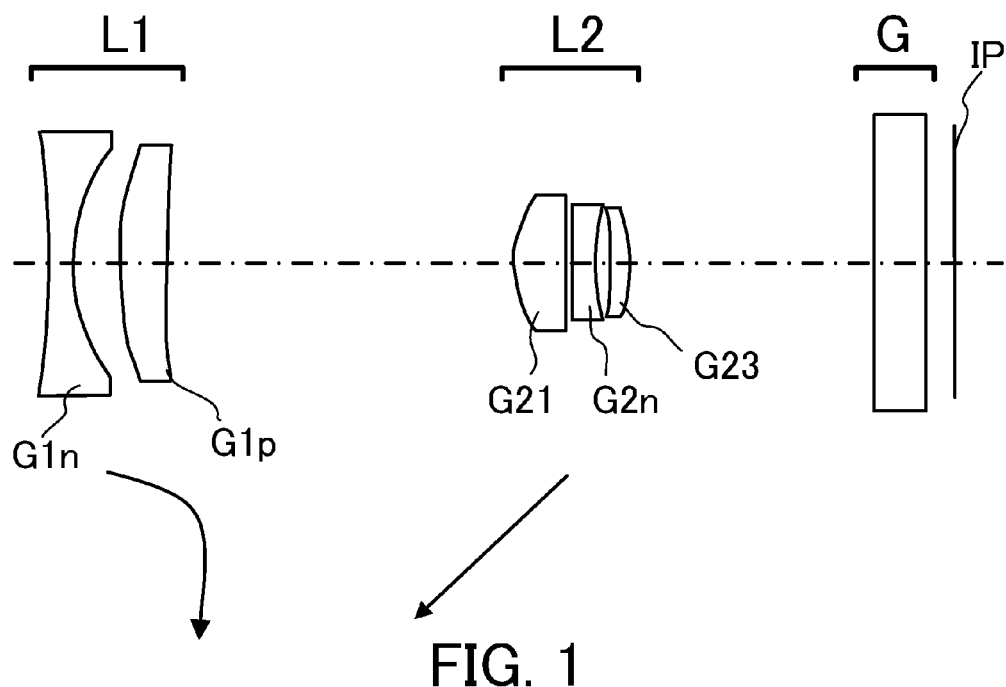
FIG. 1 is a cross-sectional diagram of a zoom lens at a wide-angle end in Embodiment 1.
Figure 2A:
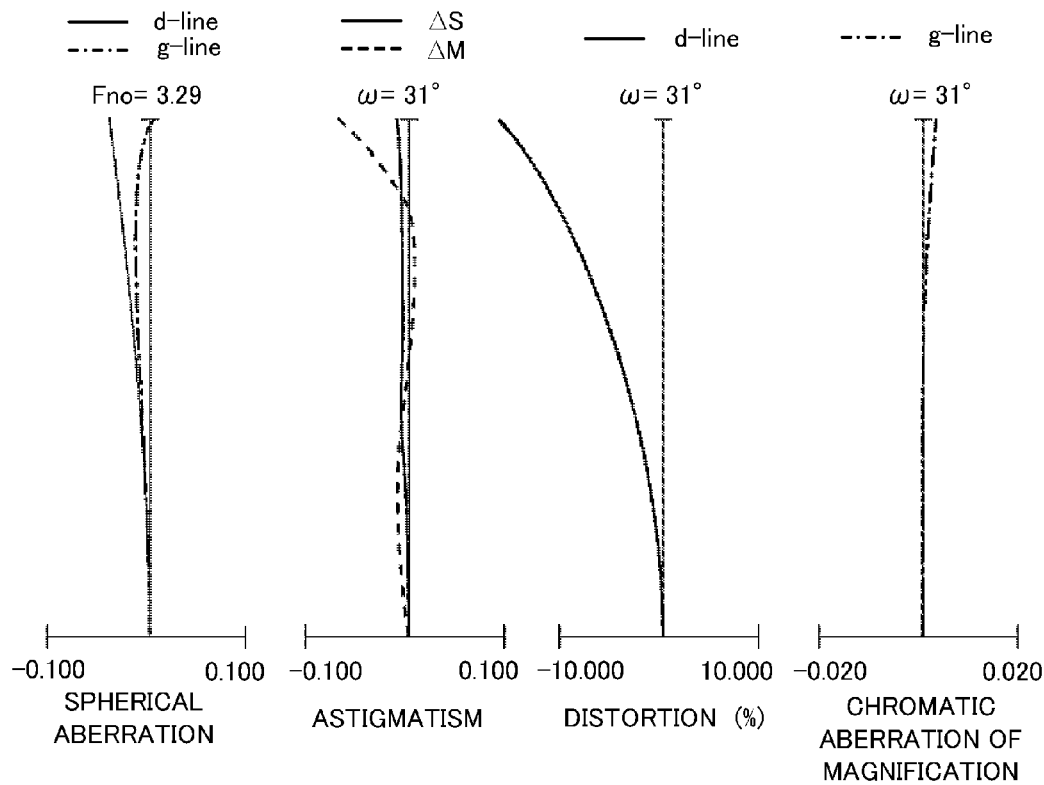
FIGS. 2A to 2C are aberration diagrams of a zoom lens at a wide-angle end, at an intermediate zoom position, and at a telephoto end in Embodiment 1.
Figure 2B:
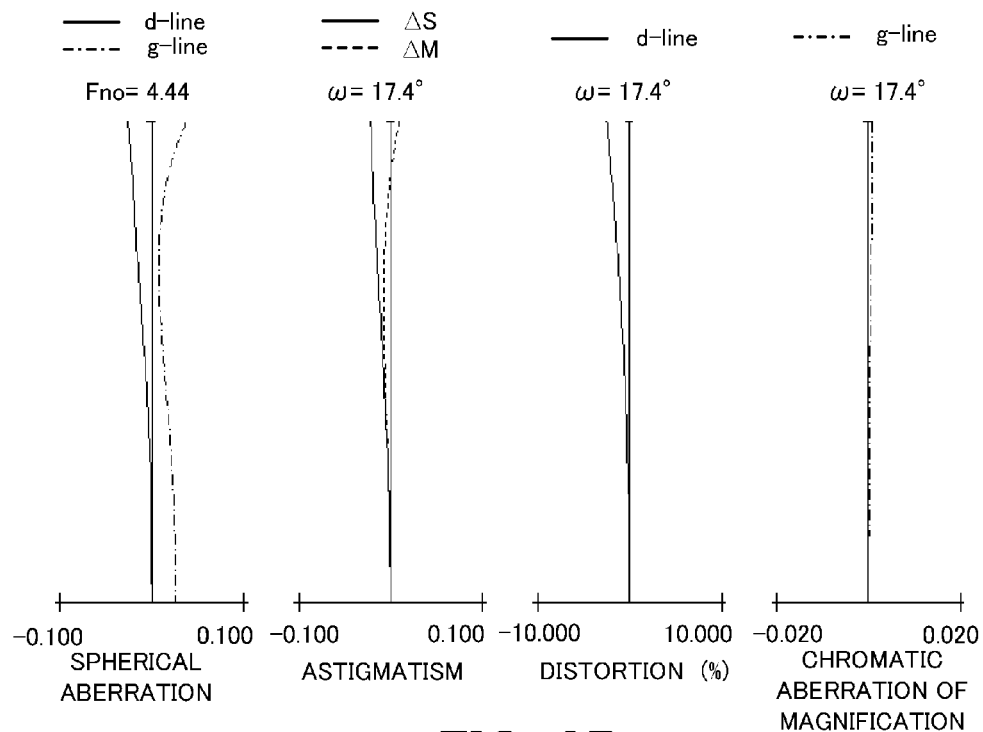
Figure 2C:
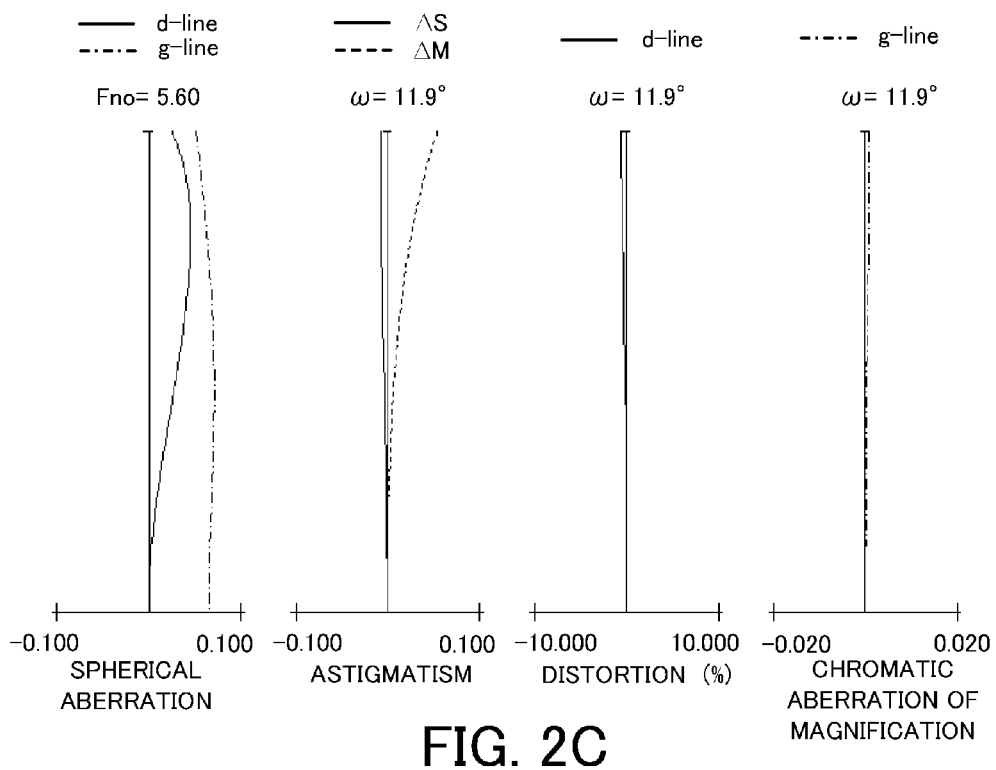

FIG. 1 is a cross-sectional diagram of a zoom lens at a wide-angle end (at a short focal length end) in Embodiment 1 of the present invention. FIGS. 2A to 2C are aberration diagrams of the zoom lens of Embodiment 1 at a wide-angle end, at an intermediate zoom position, and at a telephoto end (at a long focal length end), respectively.

Figure 3:
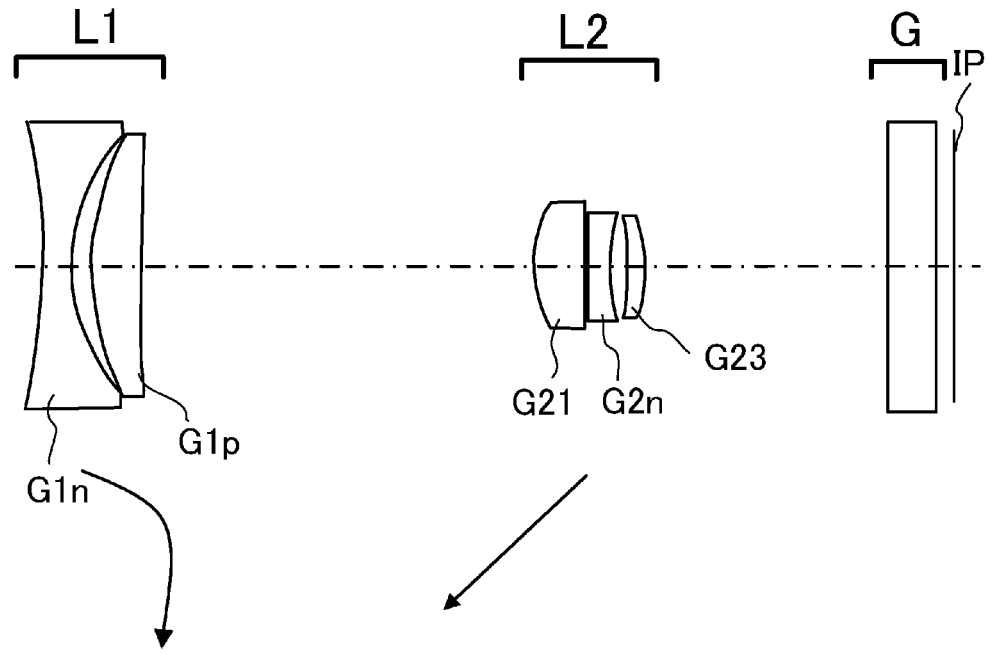
FIG. 3 is a cross-sectional diagram of a zoom lens at a wide-angle end in Embodiment 2.
Figure 4A:
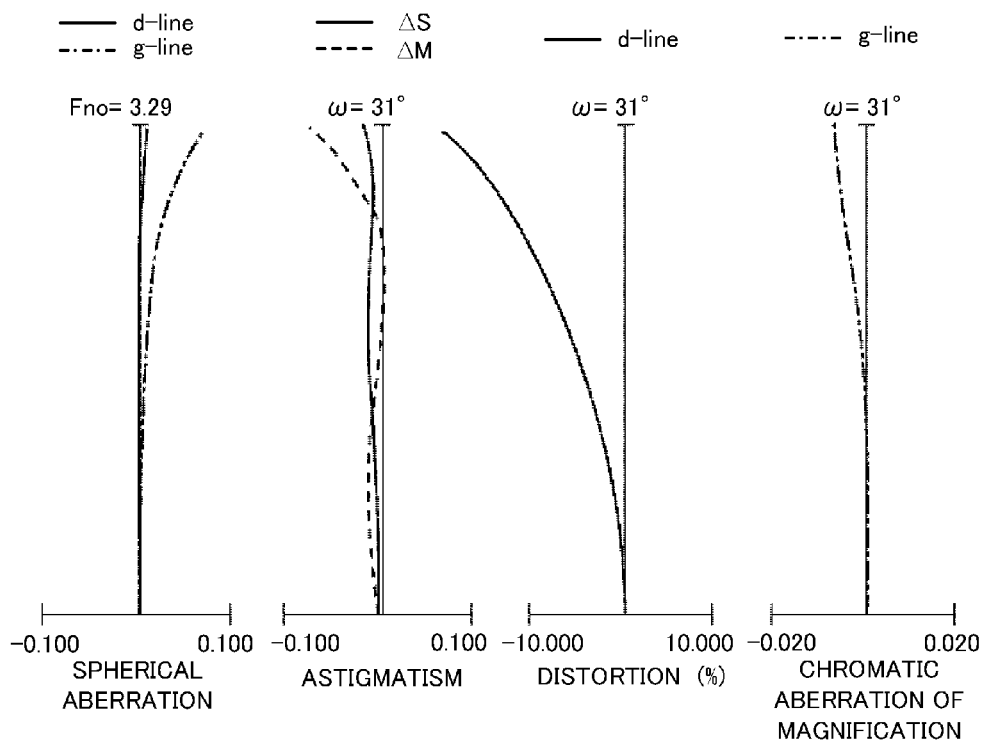
FIGS. 4A to 4C are aberration diagrams of a zoom lens at a wide-angle end, at an intermediate zoom position, and at a telephoto end in Embodiment 2.
Figure 4B:
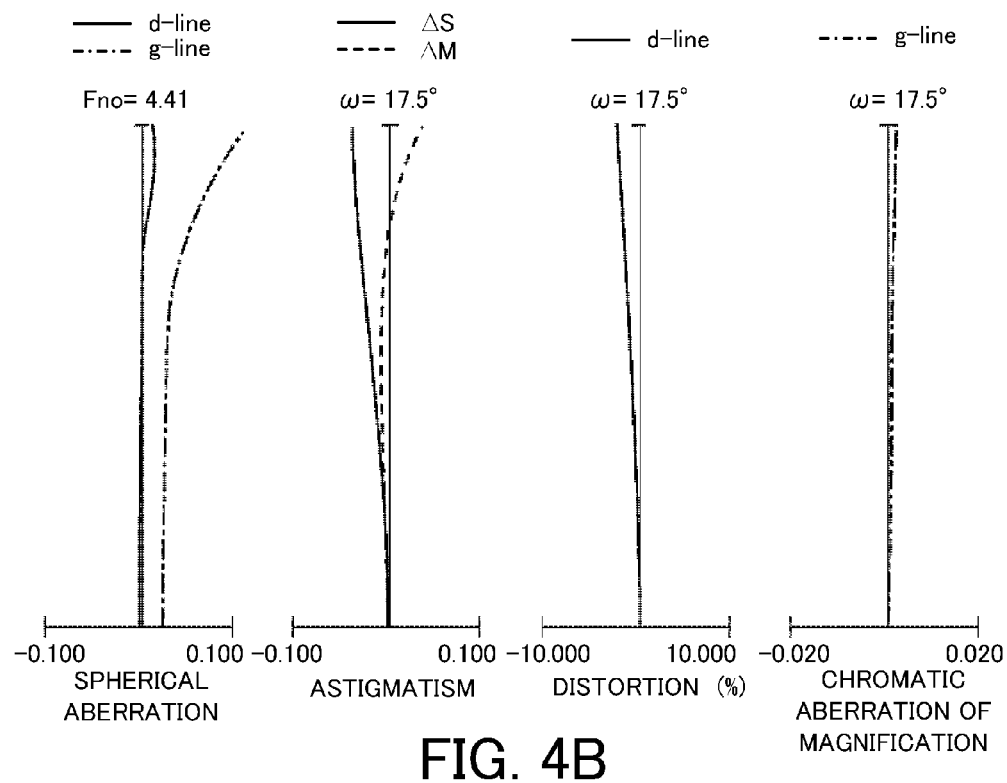
Figure 4C:
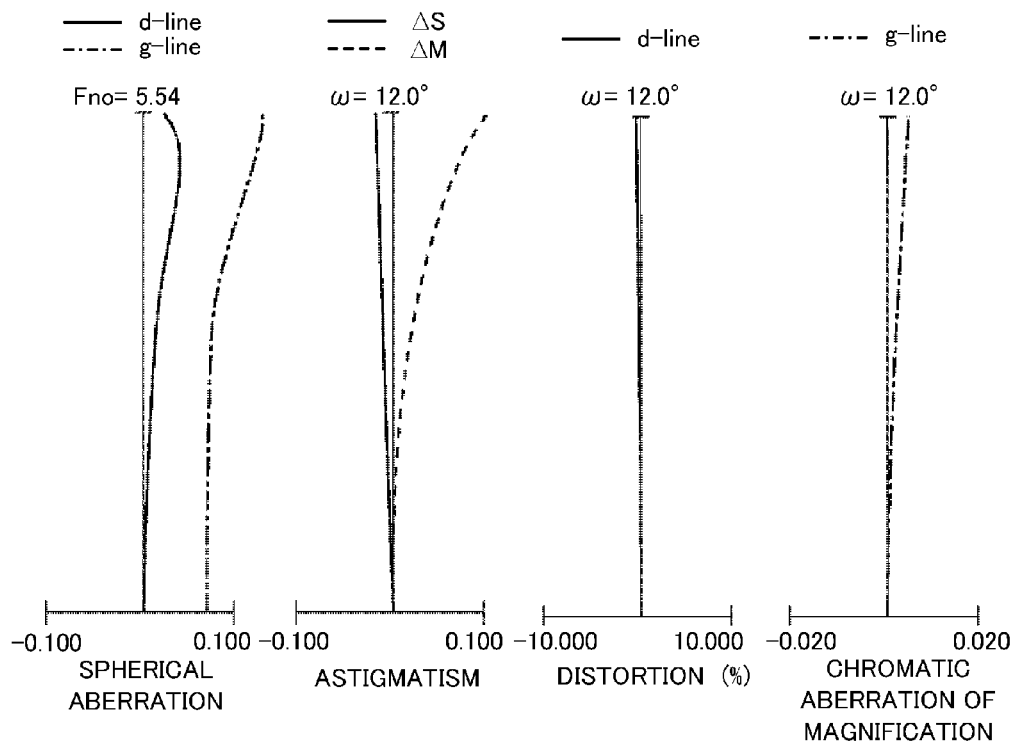

FIG. 3 is a cross-sectional diagram of a zoom lens at a wide-angle end in Embodiment 2 of the present invention. FIGS. 4A to 4C are aberration diagrams of the zoom lens of Embodiment 2 at a wide-angle end, at an intermediate zoom position, and at a telephoto end, respectively.

Figure 5:
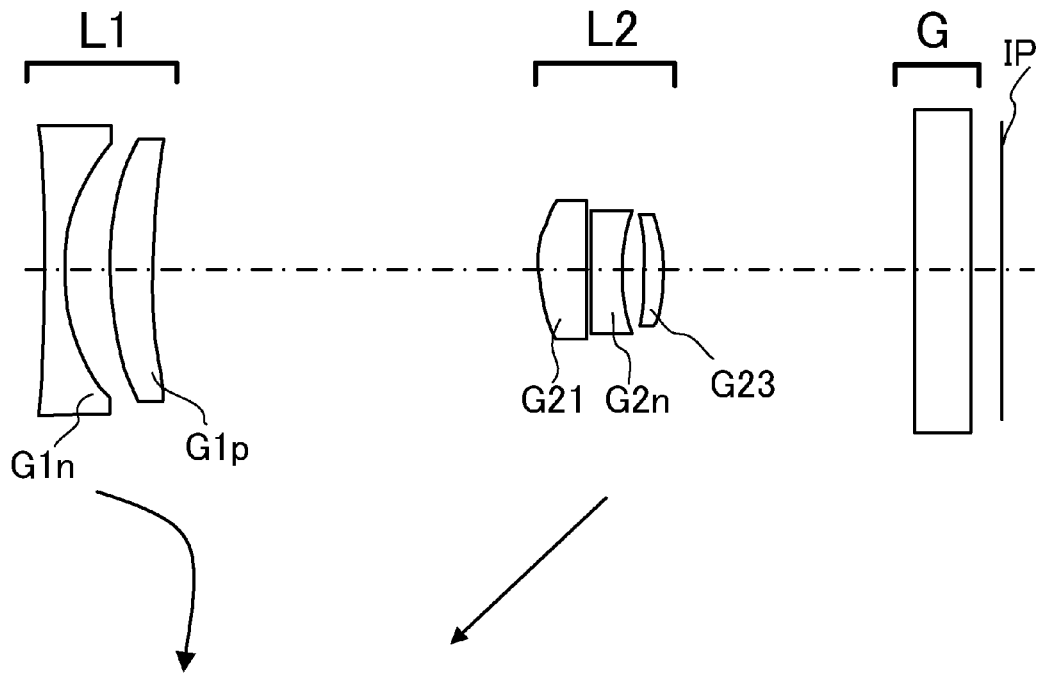
FIG. 5 is a cross-sectional diagram of a zoom lens at a wide-angle end in Embodiment 3.
Figure 6A:
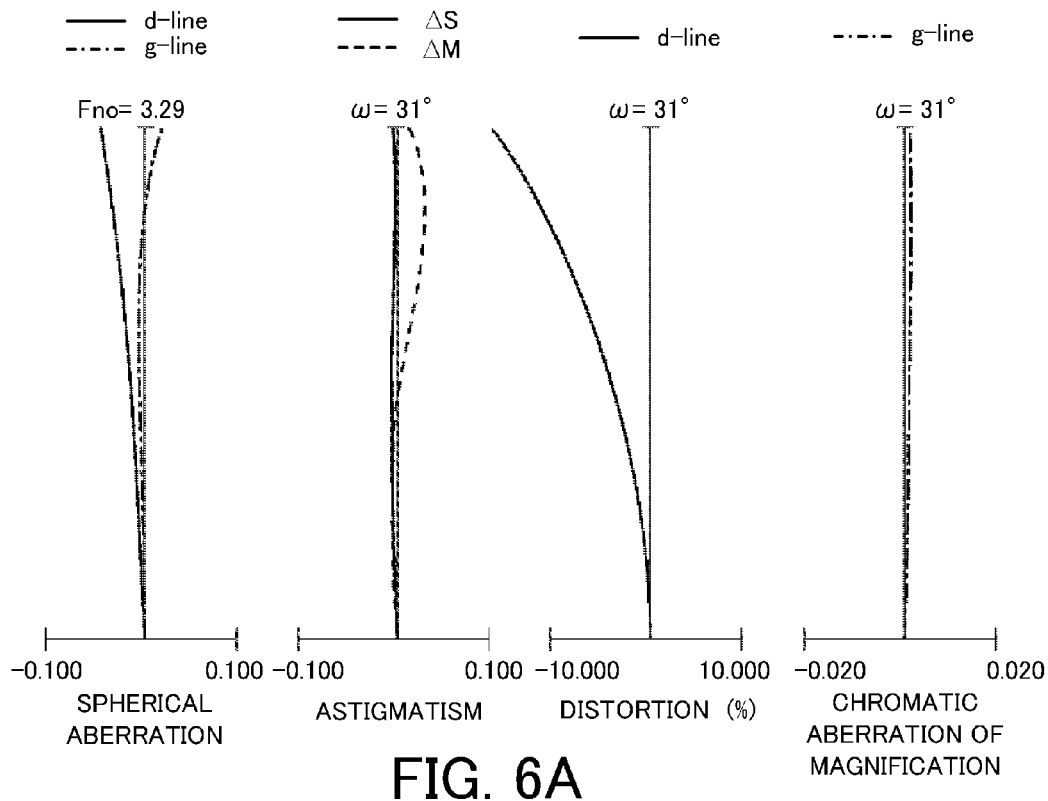
FIGS. 6A to 6C are aberration diagrams of a zoom lens at a wide-angle end, at an intermediate zoom position, and at a telephoto end in Embodiment 3.
Figure 6B:
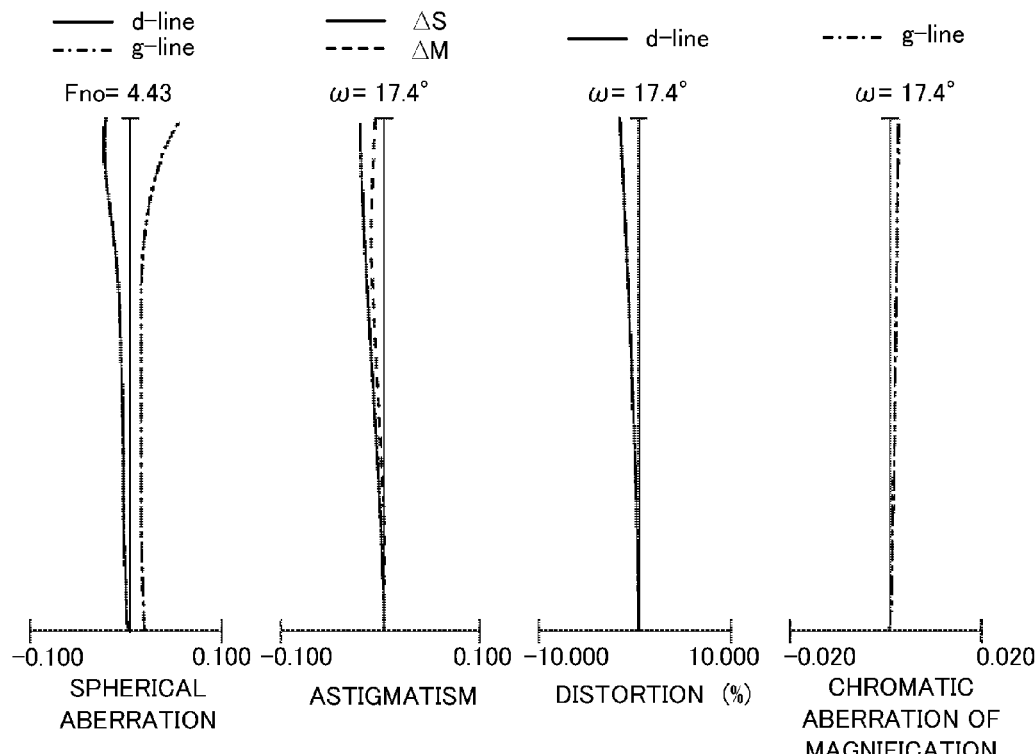
Figure 6C:
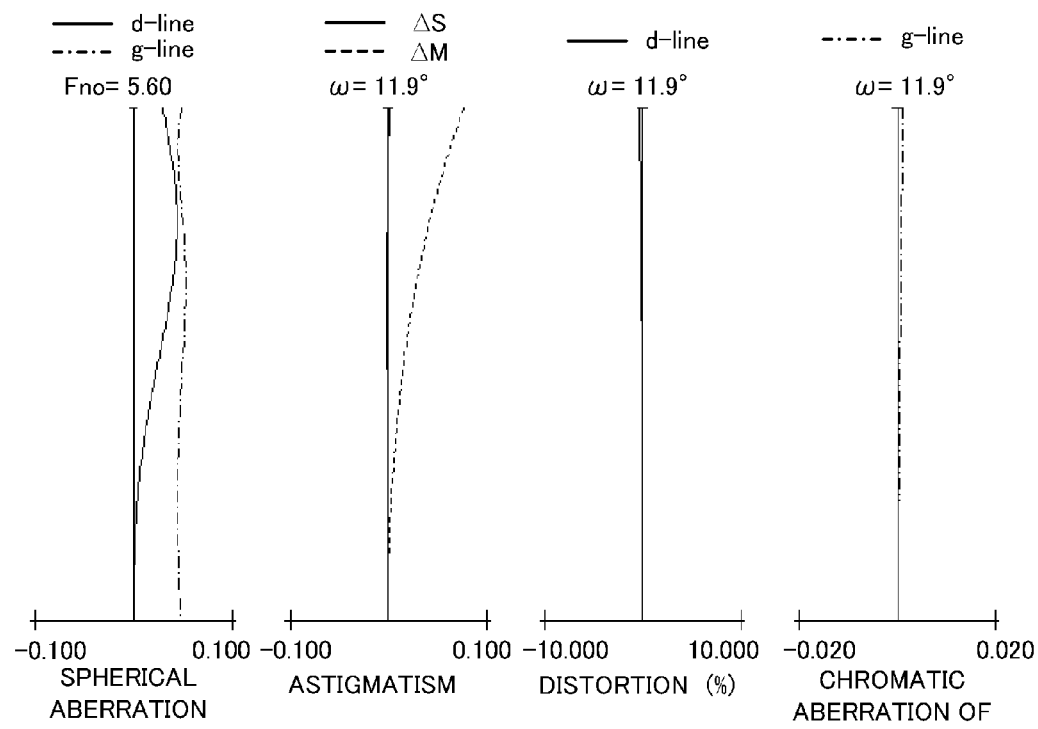

FIG. 5 is a cross-sectional diagram of a zoom lens at a wide-angle end in Embodiment 3 of the present invention. FIGS. 6A to 6C are aberration diagrams of the zoom lens of Embodiment 3 at a wide-angle end, at an intermediate zoom position, and at a telephoto end, respectively.

Figure 7:
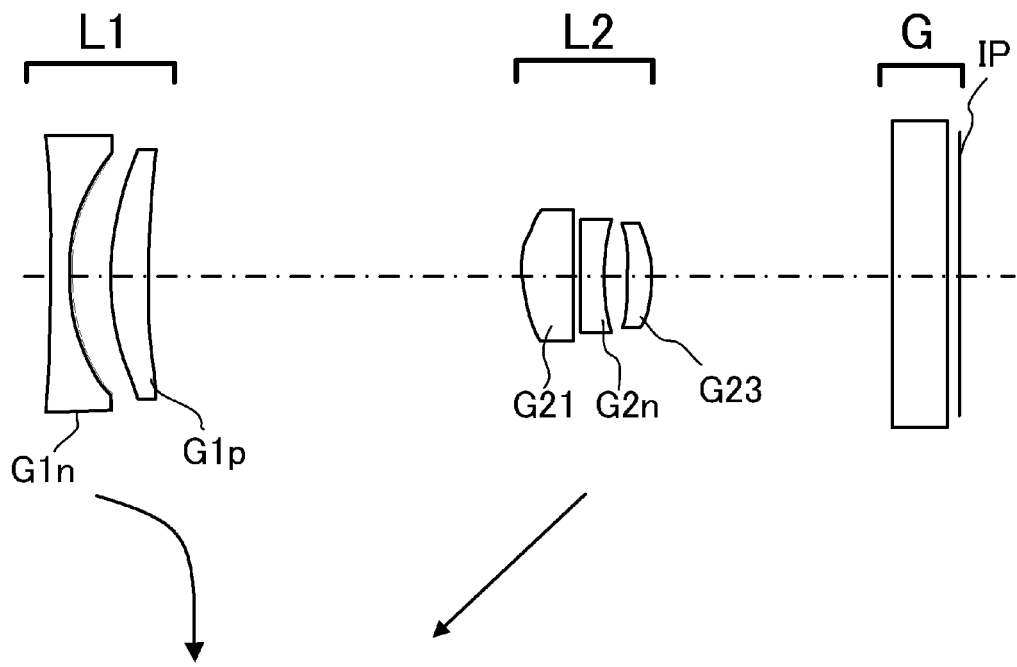
FIG. 7 is a cross-sectional diagram of a zoom lens at a wide-angle end in Embodiment 4.
Figure 8A:
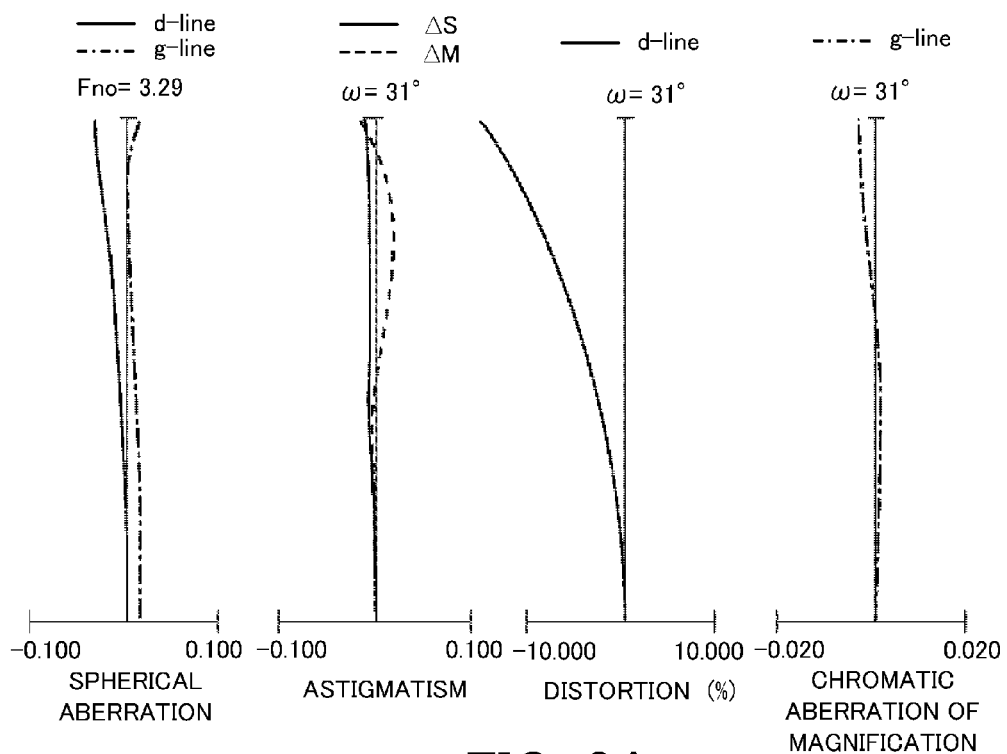
FIGS. 8A to 8C are aberration diagrams of a zoom lens at a wide-angle end, at an intermediate zoom position, and at a telephoto end in Embodiment 4.
Figure 8B:
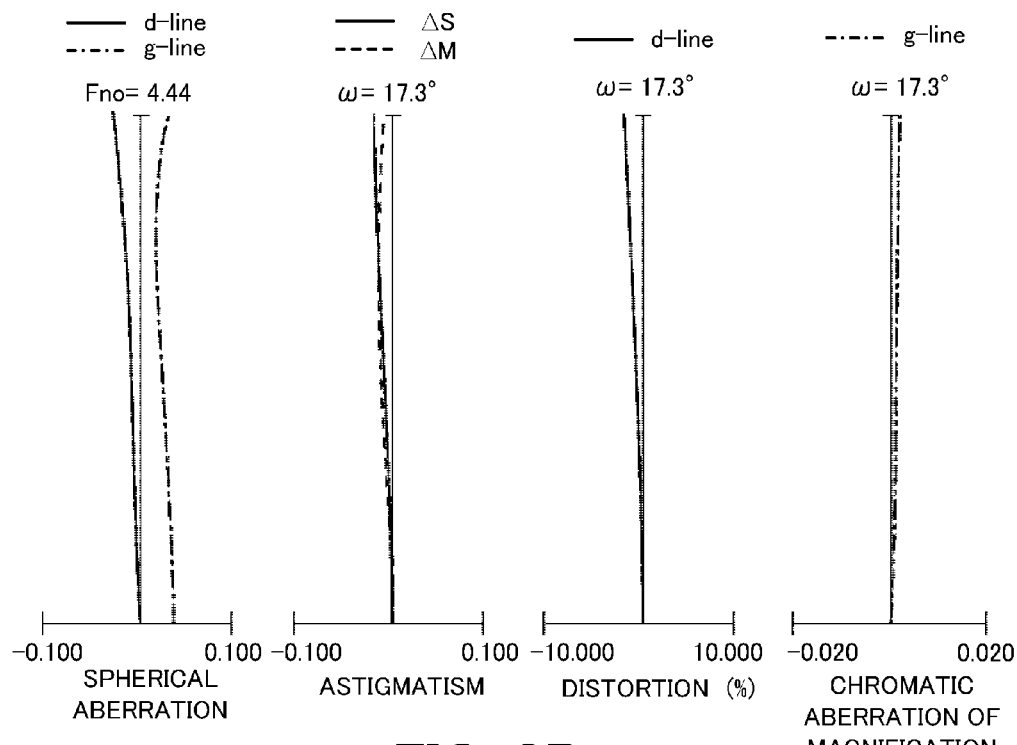
Figure 8C:
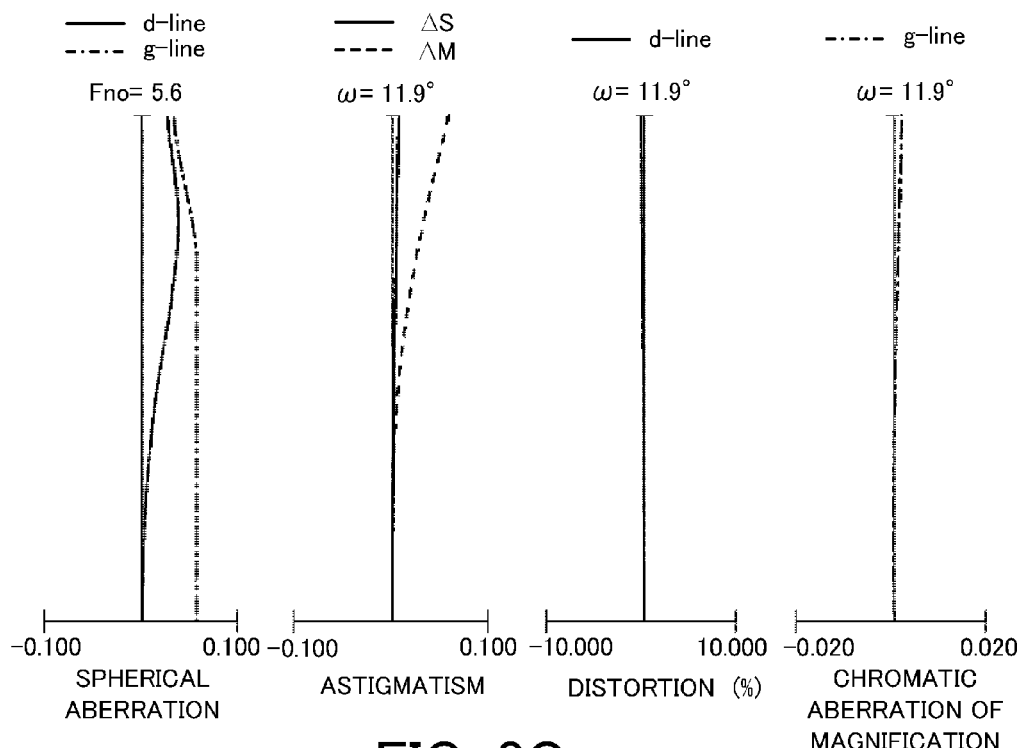

FIG. 7 is a cross-sectional diagram of a zoom lens at a wide-angle end in Embodiment 4 of the present invention. FIGS. 8A to 8C are aberration diagrams of the zoom lens of Embodiment 4 at a wide-angle end, at an intermediate zoom position, and at a telephoto end, respectively.

Figure 9:
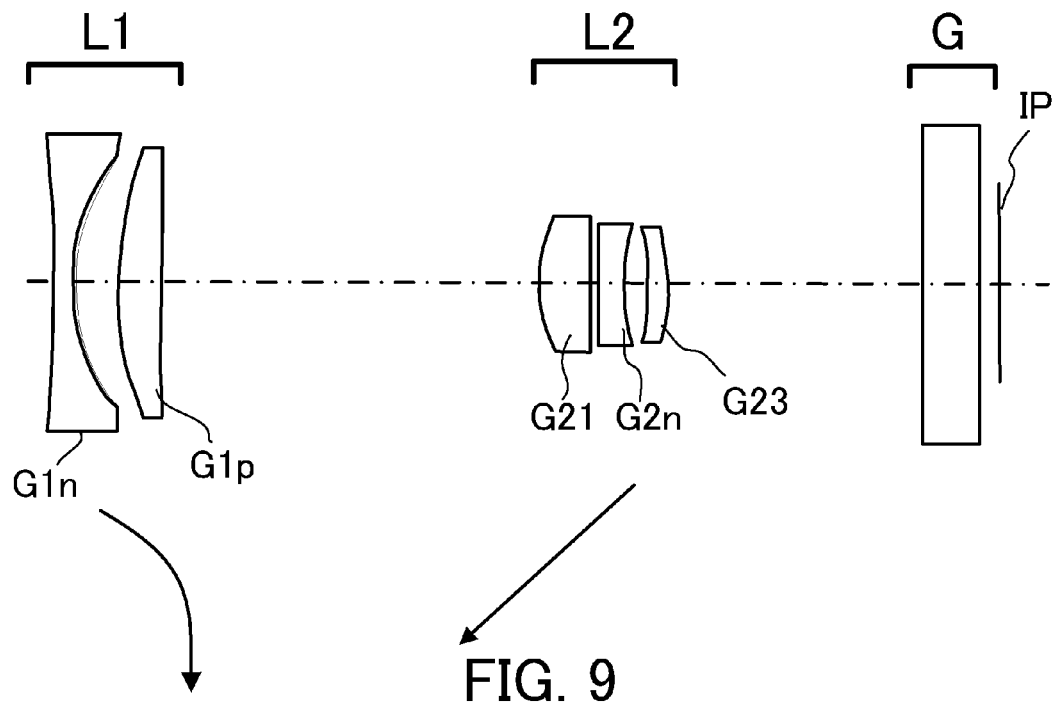
FIG. 9 is a cross-sectional diagram of a zoom lens at a wide-angle end in Embodiment 5.
Figure 10A:
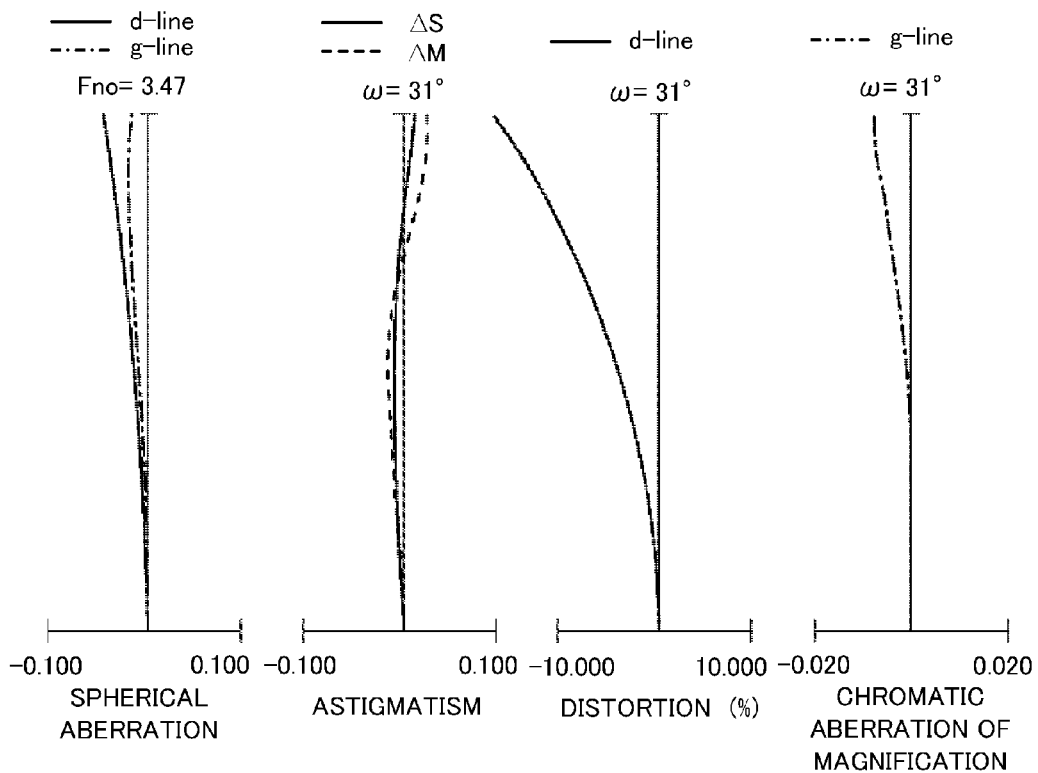
FIGS. 10A to 10C are aberration diagrams of a zoom lens at a wide-angle end, at an intermediate zoom position, and at a telephoto end in Embodiment 5.
Figure 10B:
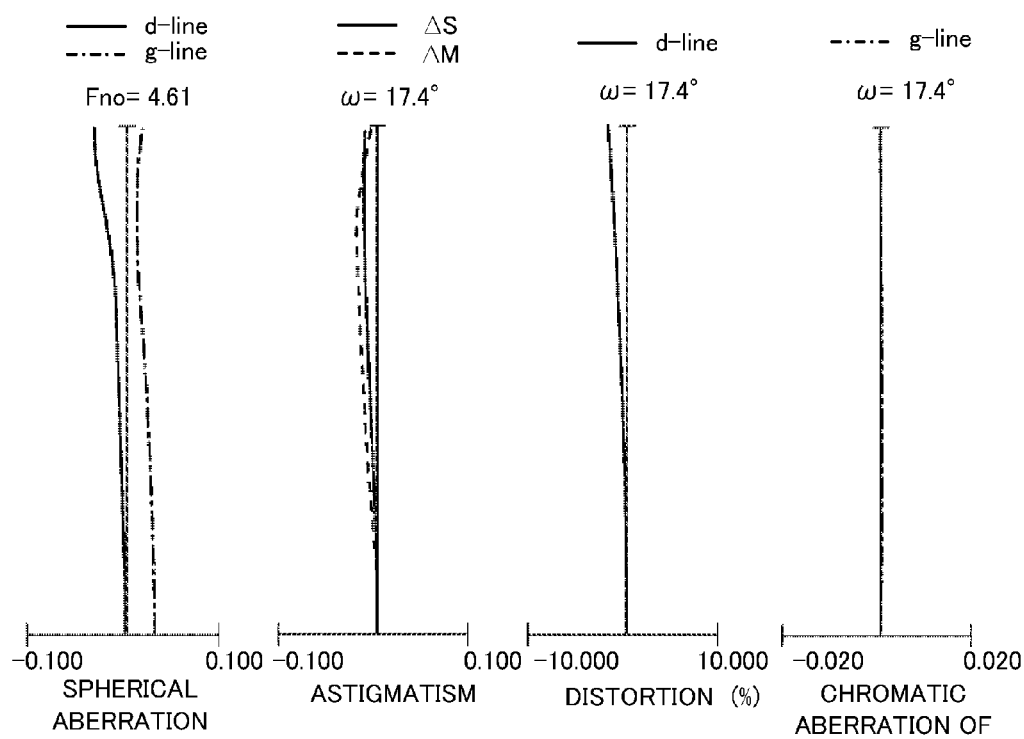
Figure 10C:
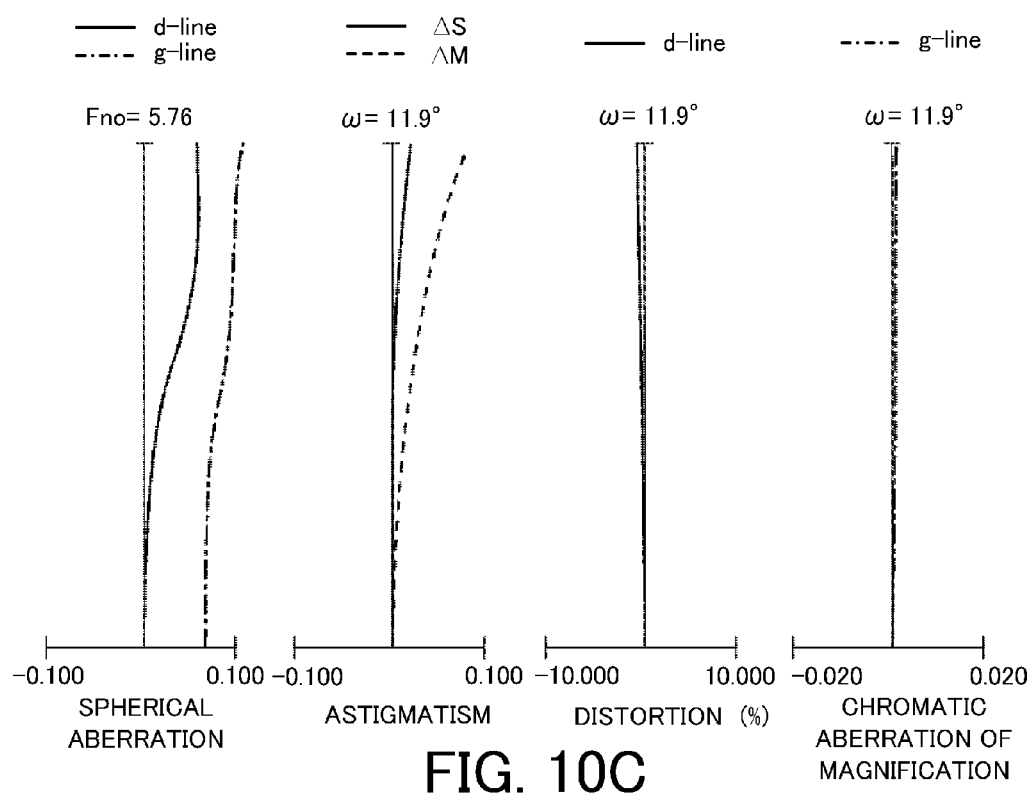

FIG. 9 is a cross-sectional diagram of a zoom lens at a wide-angle end in Embodiment 5 of the present invention. FIGS. 10A to 10C are aberration diagrams of the zoom lens of Embodiment 5 at a wide-angle end, at an intermediate zoom position, and at a telephoto end, respectively.

Figure 11:
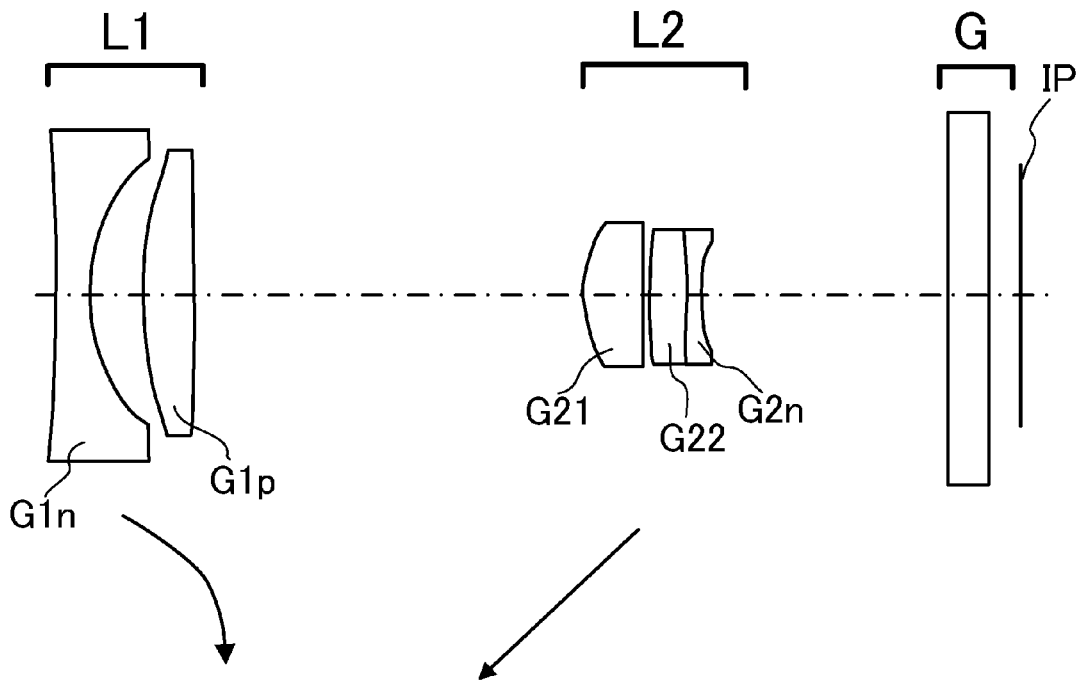
FIG. 11 is a cross-sectional diagram of a zoom lens at a wide-angle end in Embodiment 6.
Figure 12A:
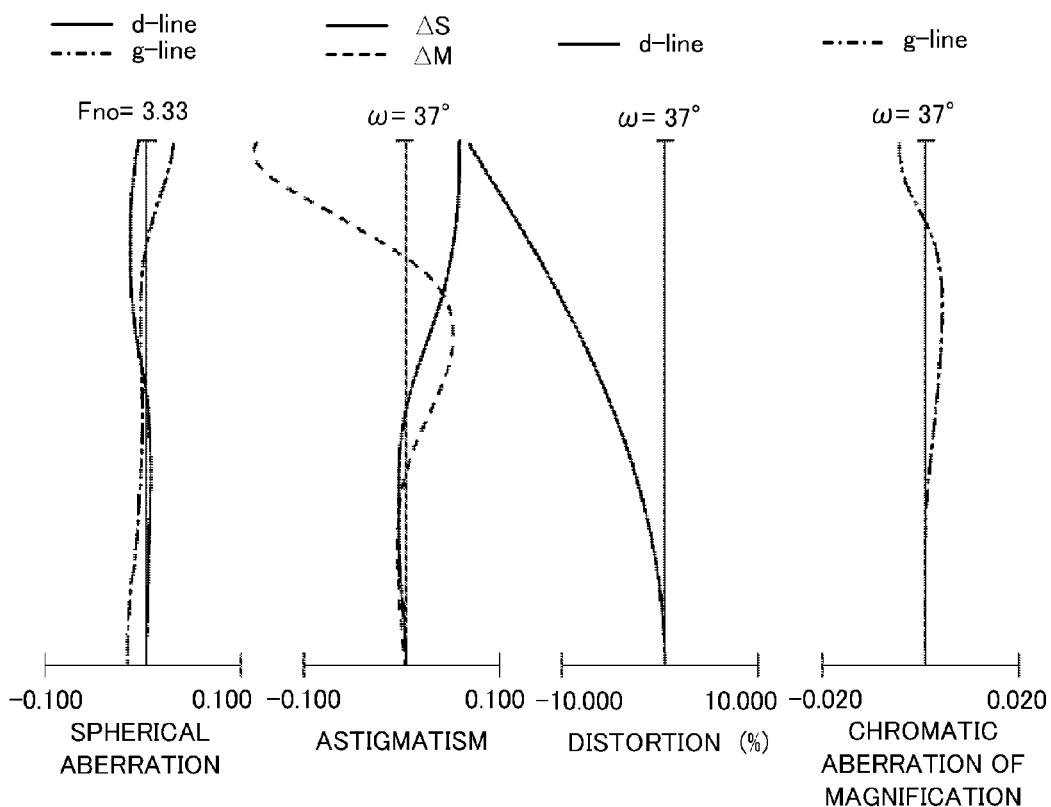
FIGS. 12A to 12C are aberration diagrams of a zoom lens at a wide-angle end, at an intermediate zoom position, and at a telephoto end in Embodiment 6.
Figure 12B:
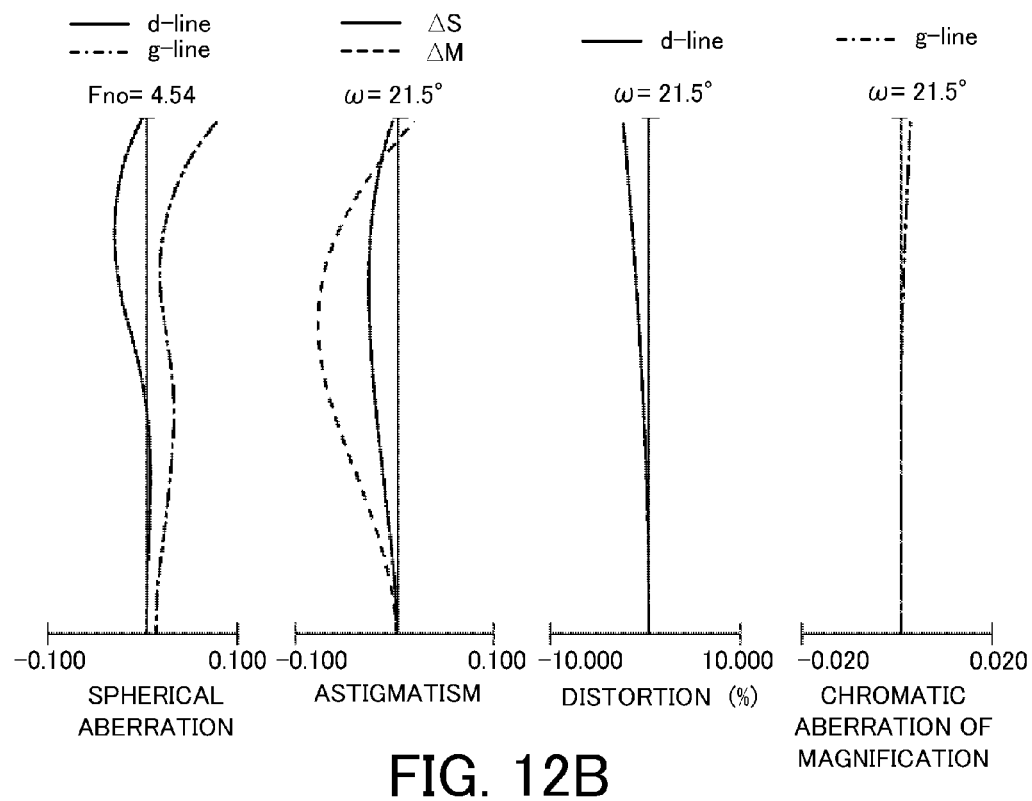
Figure 12C:
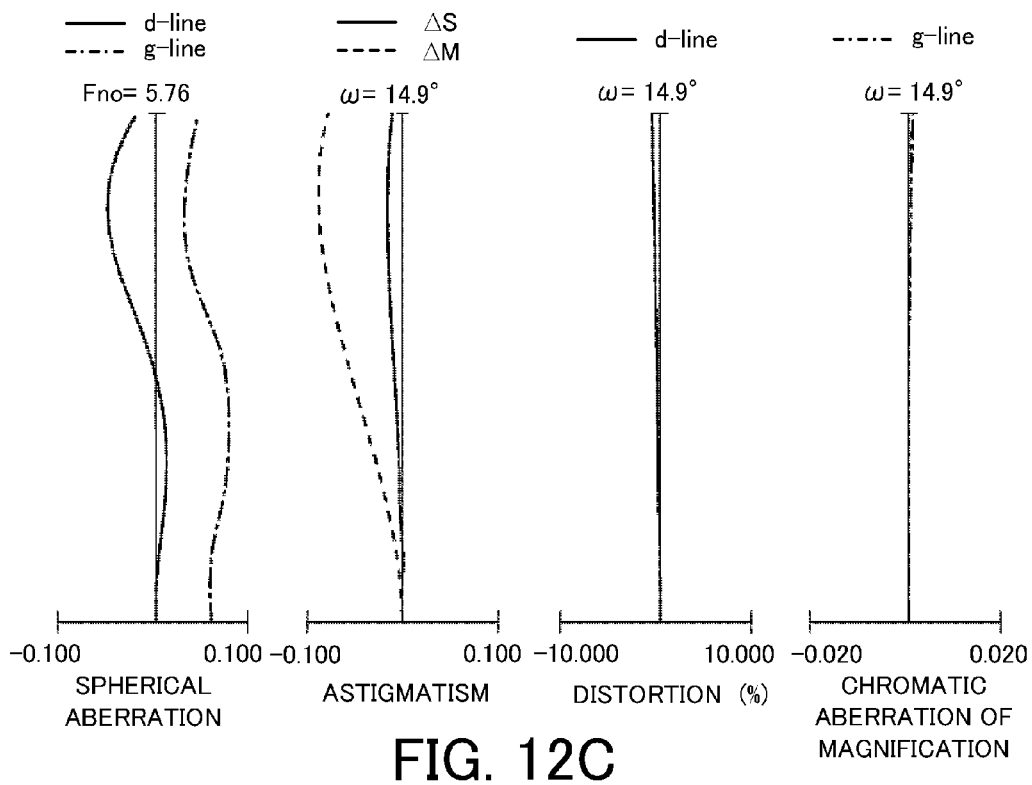

FIG. 11 is a cross-sectional diagram of a zoom lens at a wide-angle end in Embodiment 6 of the present invention. FIGS. 12A to 12C are aberration diagrams of the zoom lens of Embodiment 6 at a wide-angle end, at an intermediate zoom position, and at a telephoto end, respectively.

Figure 13:
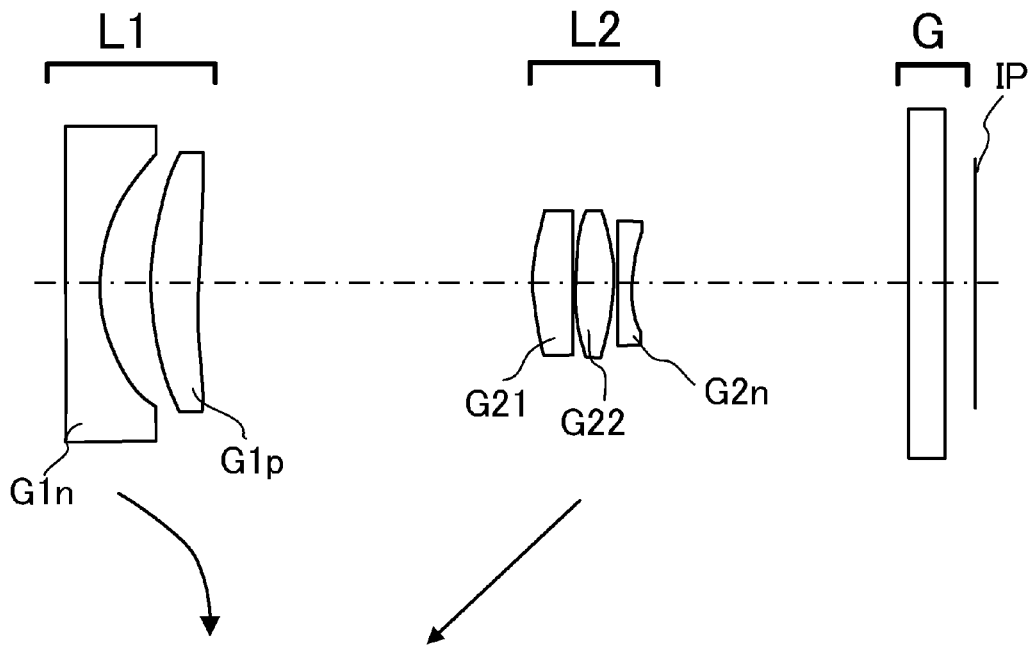
FIG. 13 is a cross-sectional diagram of a zoom lens at a wide-angle end in Embodiment 7.
Figure 14A:
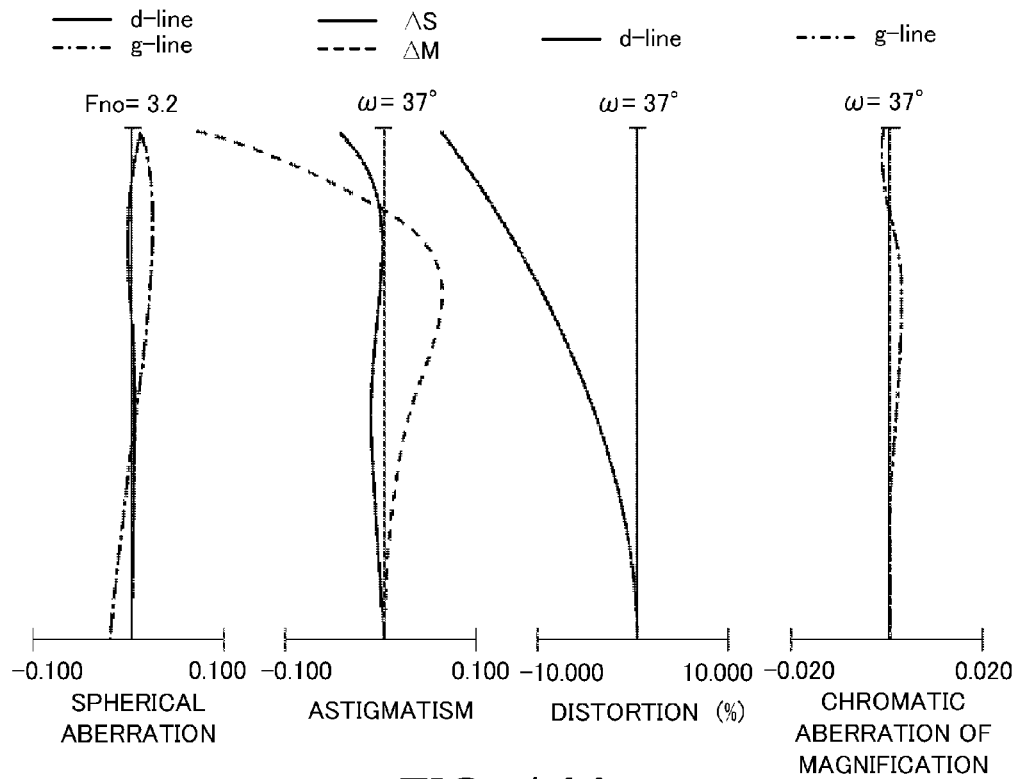
FIGS. 14A to 14C are aberration diagrams of a zoom lens at a wide-angle end, at an intermediate zoom position, and at a telephoto end in Embodiment 7.
Figure 14B:
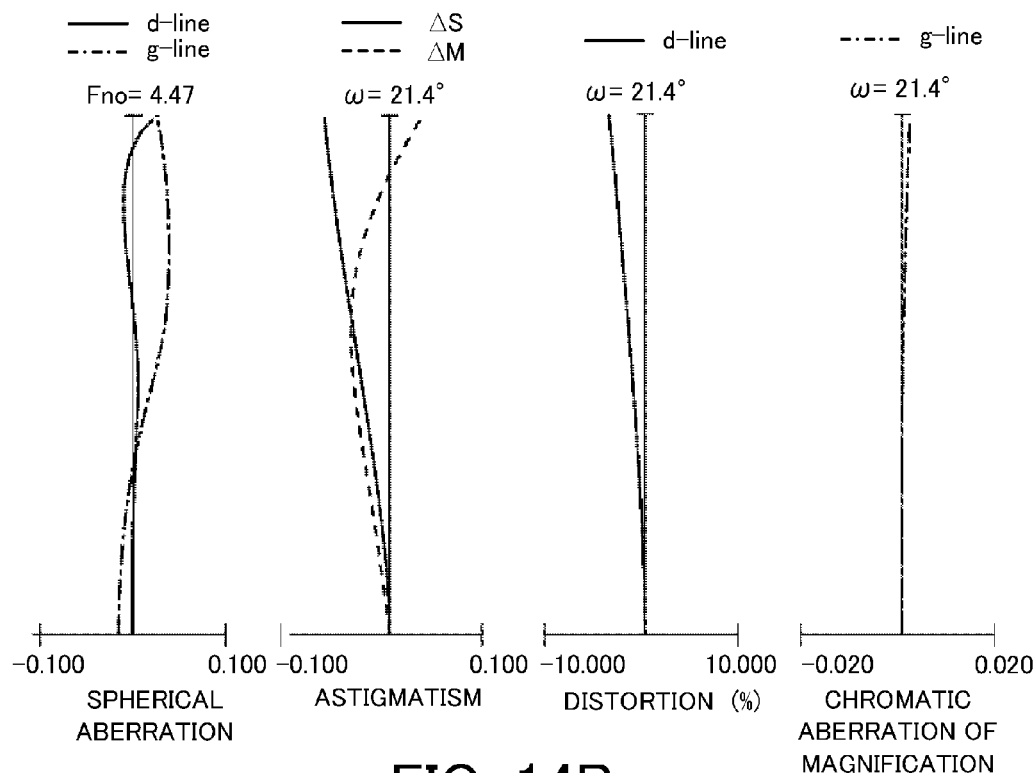
Figure 14C:
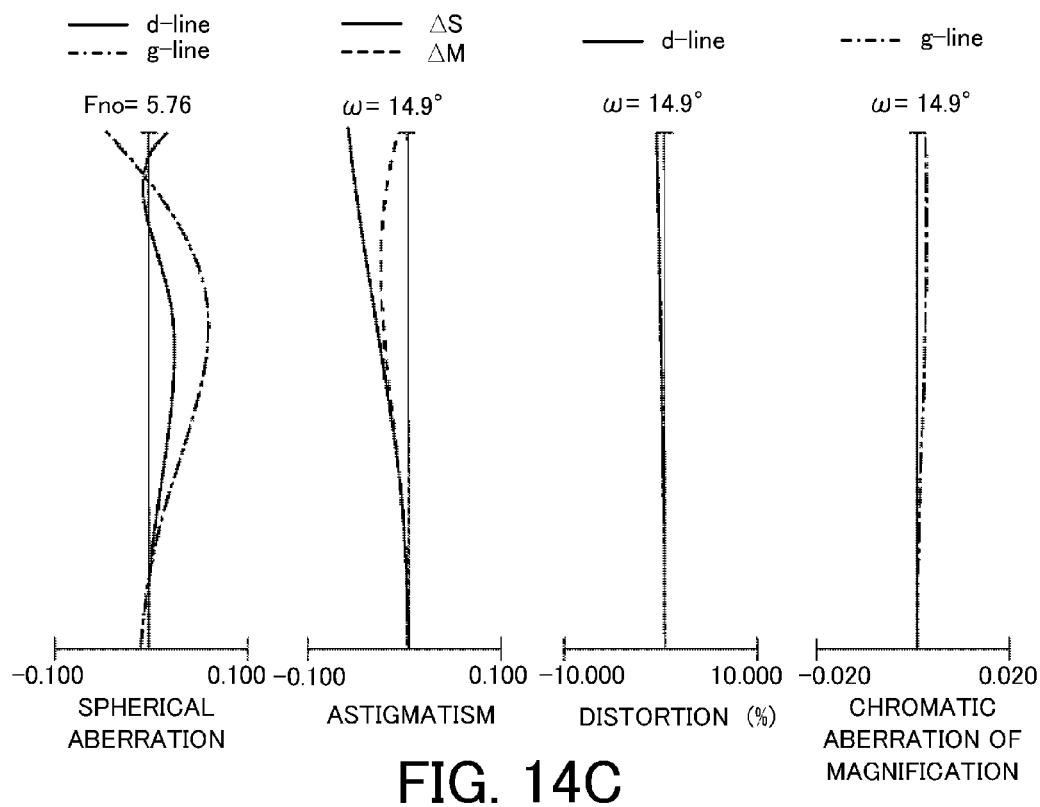

FIG. 13 is a cross-sectional diagram of a zoom lens at a wide-angle end in Embodiment 7 of the present invention. FIGS. 14A to 14C are aberration diagrams of the zoom lens of Embodiment 7 at a wide-angle end, at an intermediate zoom position, and at a telephoto end, respectively.

Figure 15:
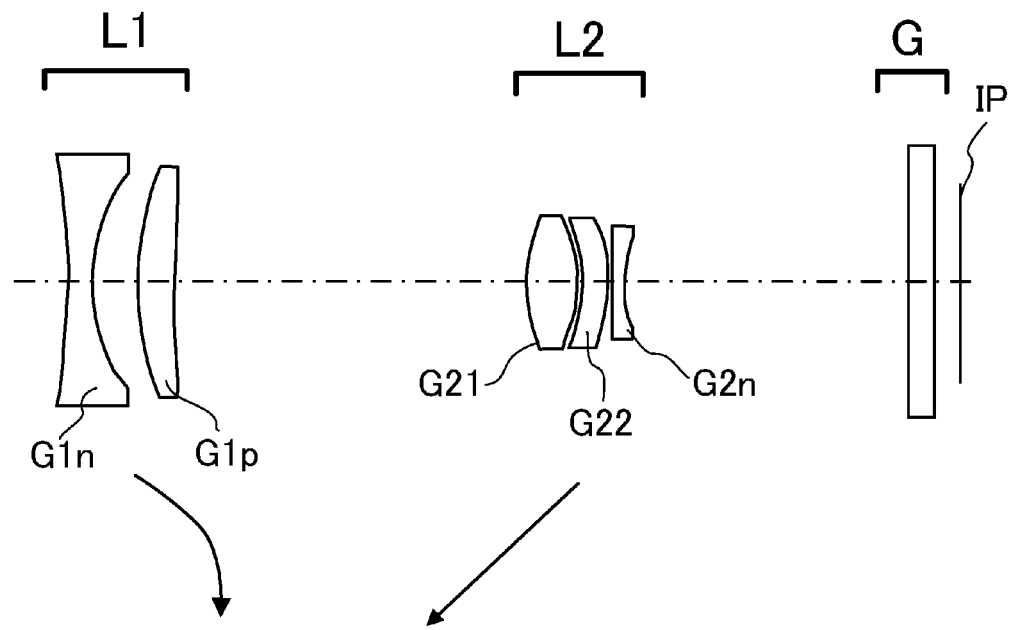
FIG. 15 is a cross-sectional diagram of a zoom lens at a wide-angle end in Embodiment 8.
Figure 16A:
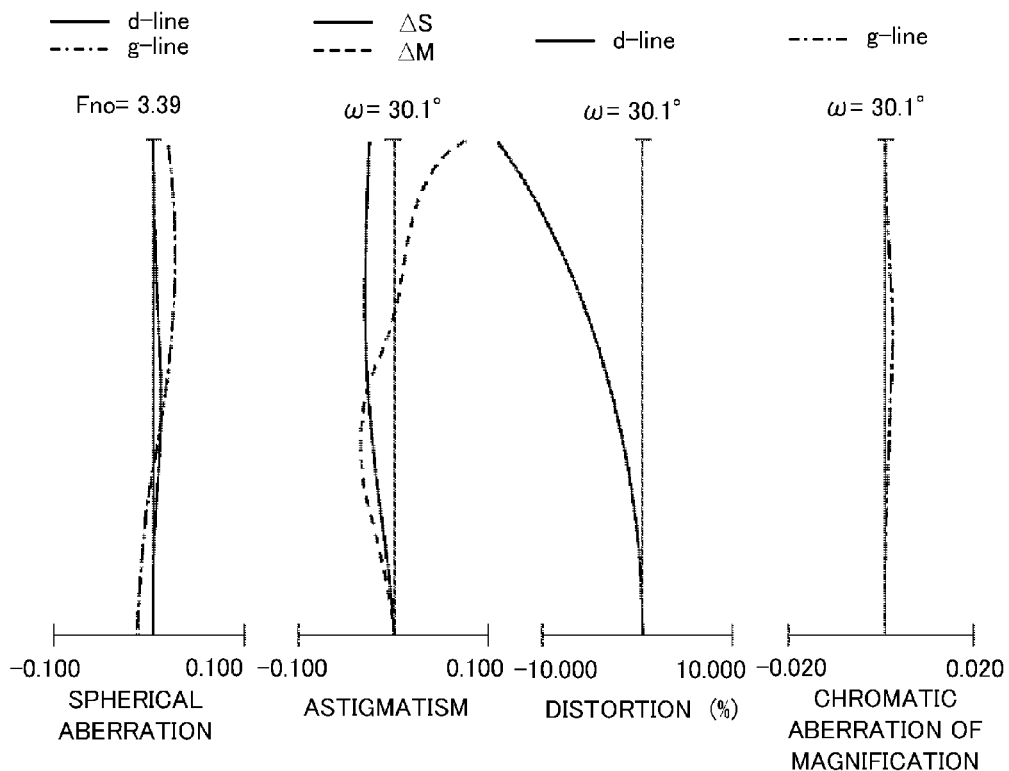
FIGS. 16A to 16C are aberration diagrams of a zoom lens at a wide-angle end, at an intermediate zoom position, and at a telephoto end in Embodiment 8.
Figure 16B:
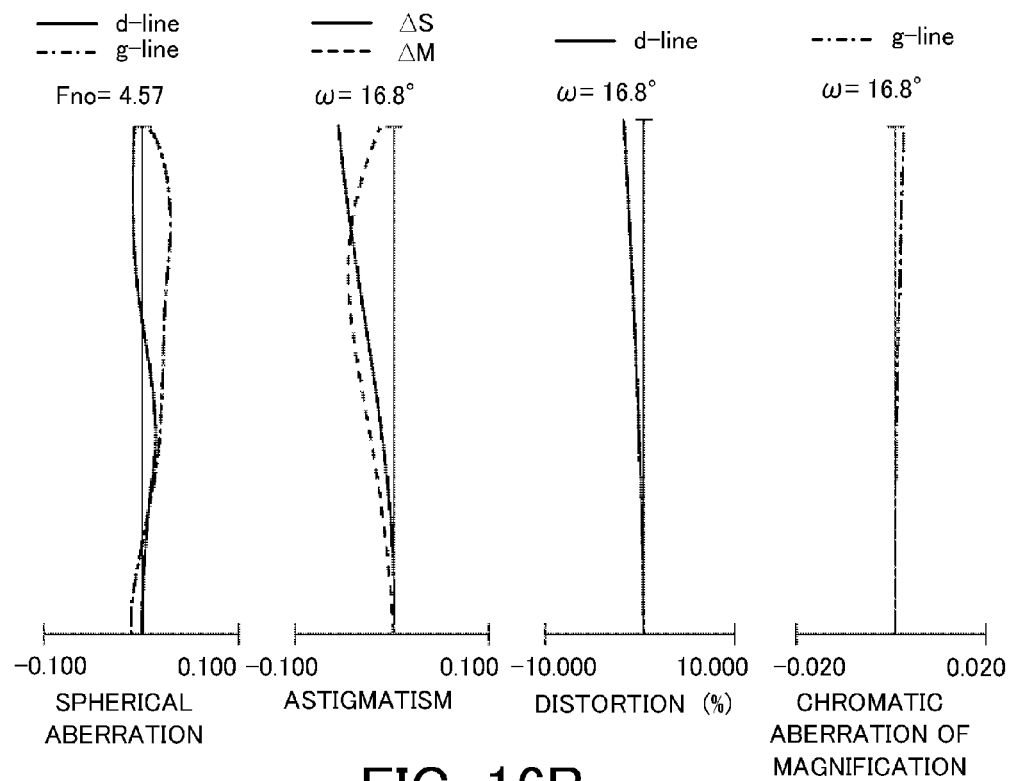
Figure 16C:
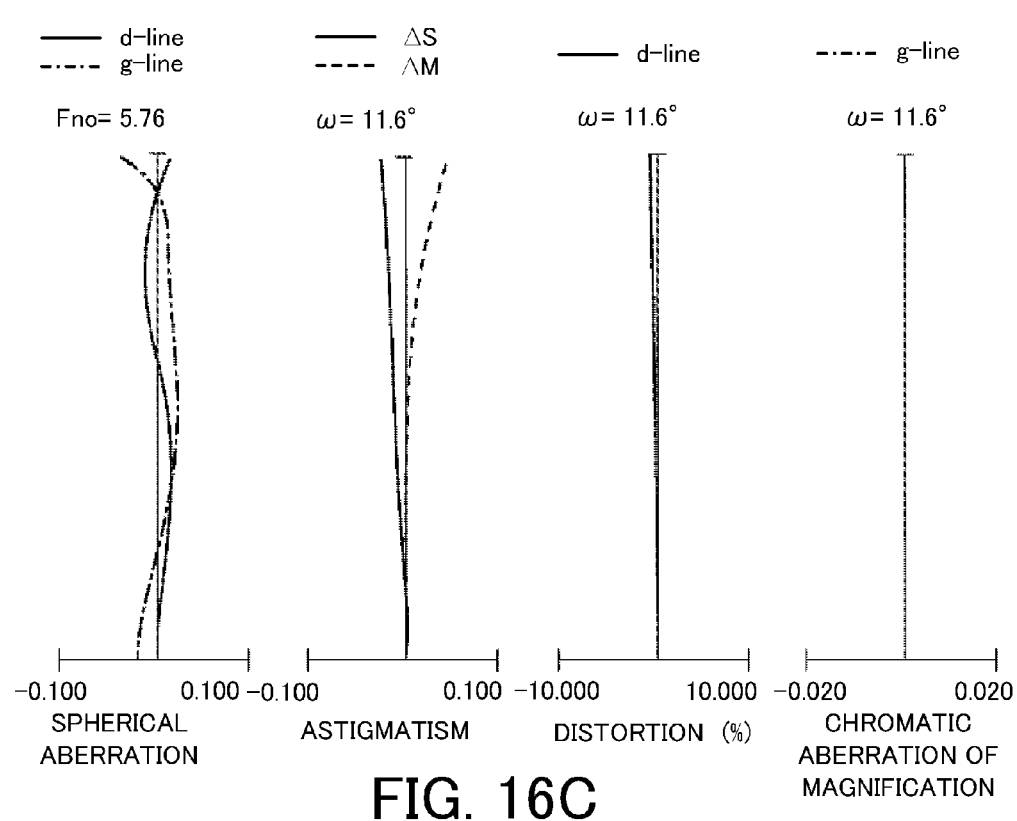

FIG. 15 is a cross-sectional diagram of a zoom lens at a wide-angle end in Embodiment 8 of the present invention. FIGS. 16A to 16C are aberration diagrams of the zoom lens of Embodiment 8 at a wide-angle end, at an intermediate zoom position, and at a telephoto end, respectively.

Figure 17:
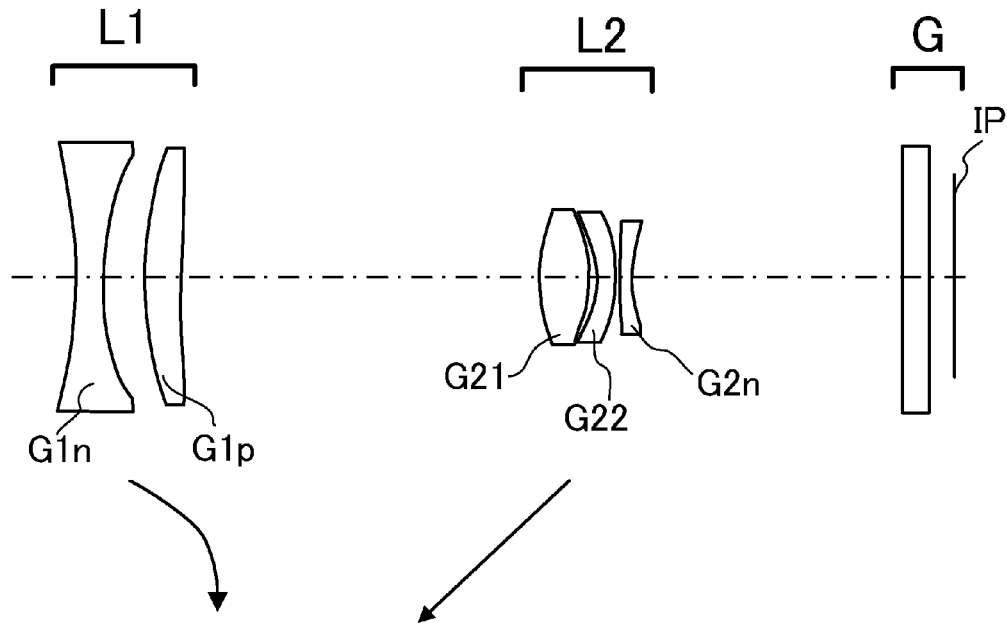
FIG. 17 is a cross-sectional diagram of a zoom lens at a wide-angle end in Embodiment 9.
Figure 18A:
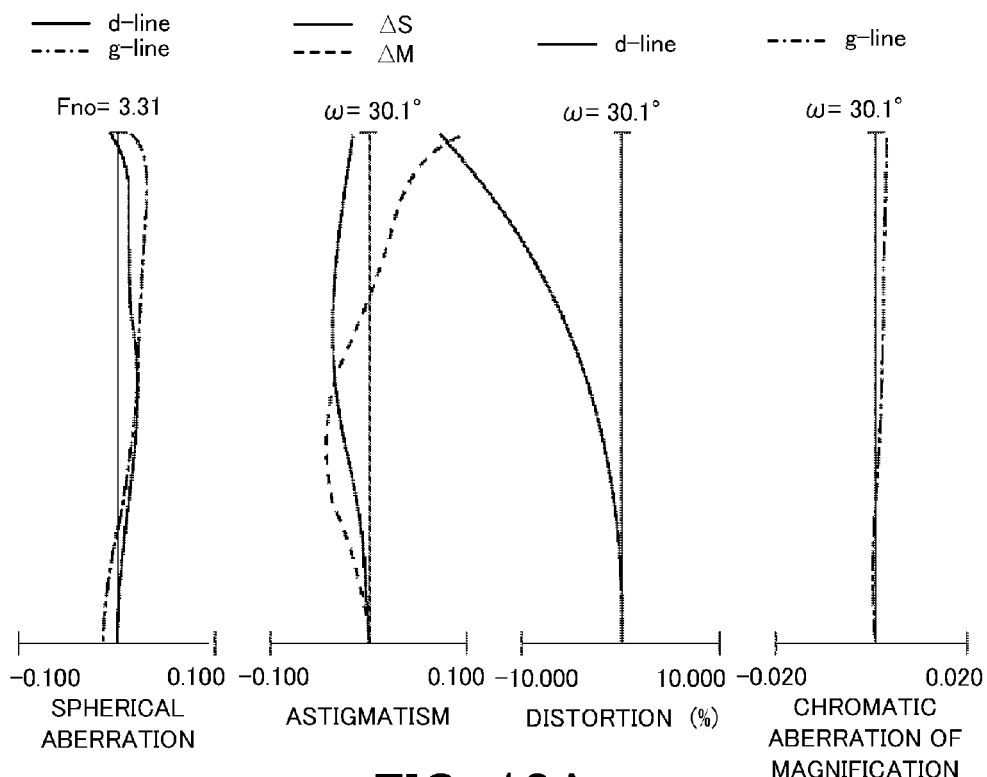
FIGS. 18A to 18C are aberration diagrams of a zoom lens at a wide-angle end, at an intermediate zoom position, and at a telephoto end in Embodiment 9.
Figure 18B:
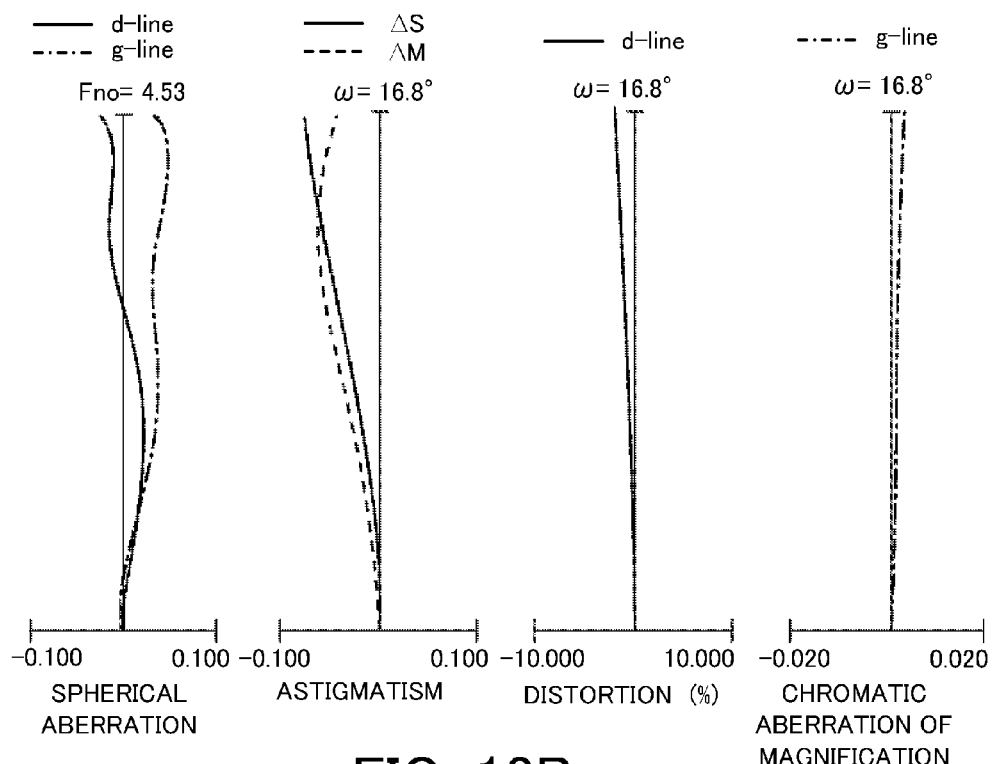
Figure 18C:
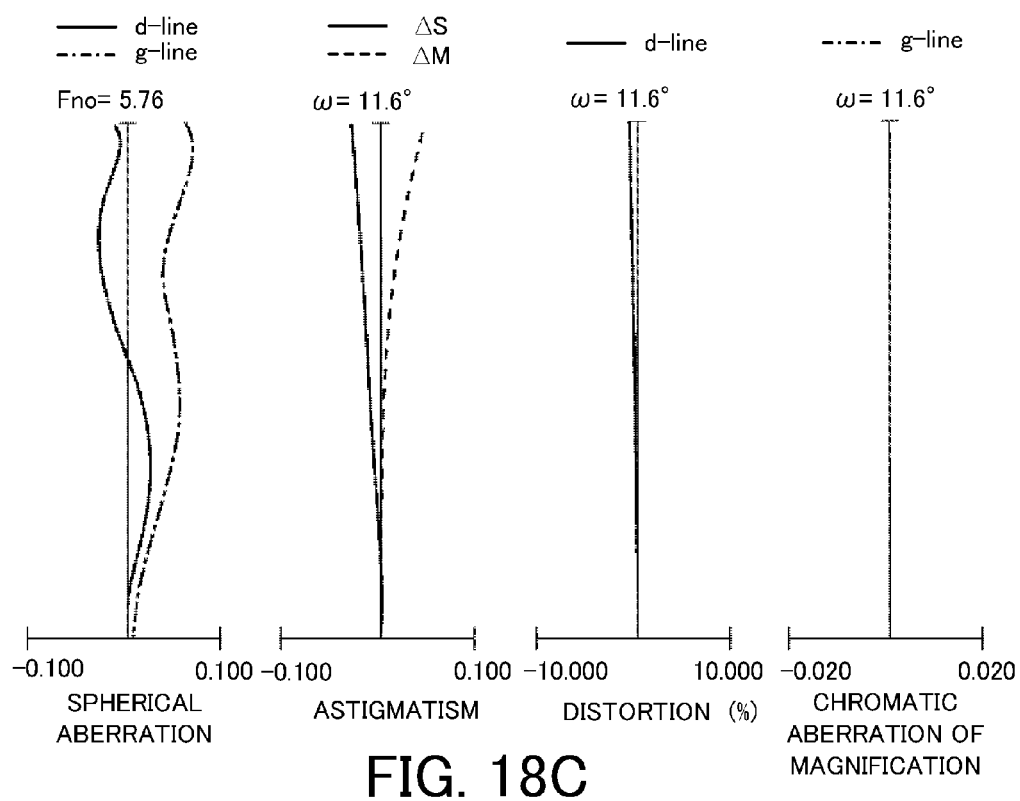

FIG. 17 is a cross-sectional diagram of a zoom lens at a wide-angle end in Embodiment 9 of the present invention. FIGS. 18A to 18C are aberration diagrams of the zoom lens of Embodiment 9 at a wide-angle end, at an intermediate zoom position, and at a telephoto end, respectively.

Figure 19:
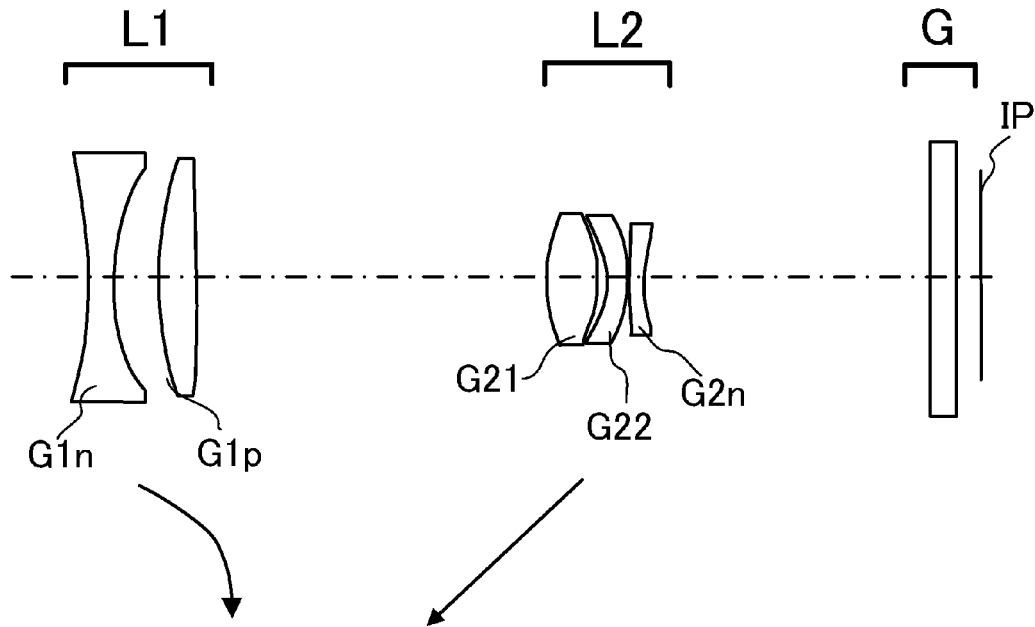
FIG. 19 is a cross-sectional diagram of a zoom lens at a wide-angle end in Embodiment 10.
Figure 20A:
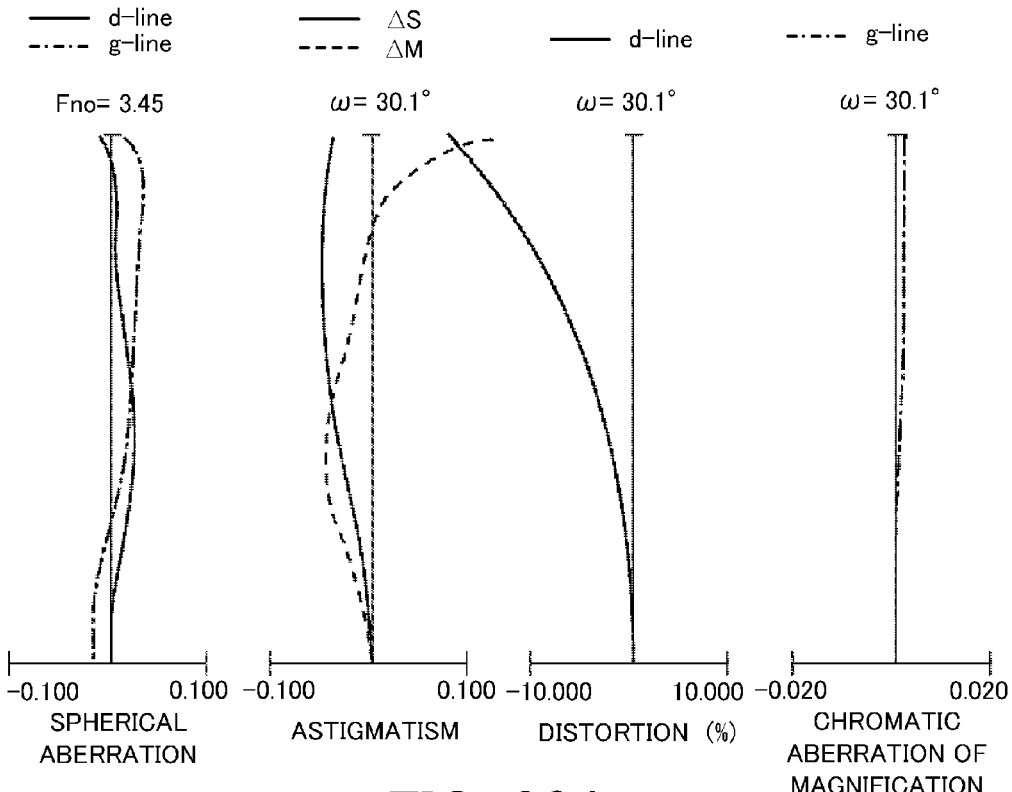
FIGS. 20A to 20C are aberration diagrams of a zoom lens at a wide-angle end, at an intermediate zoom position, and at a telephoto end in Embodiment 10.
Figure 20B:
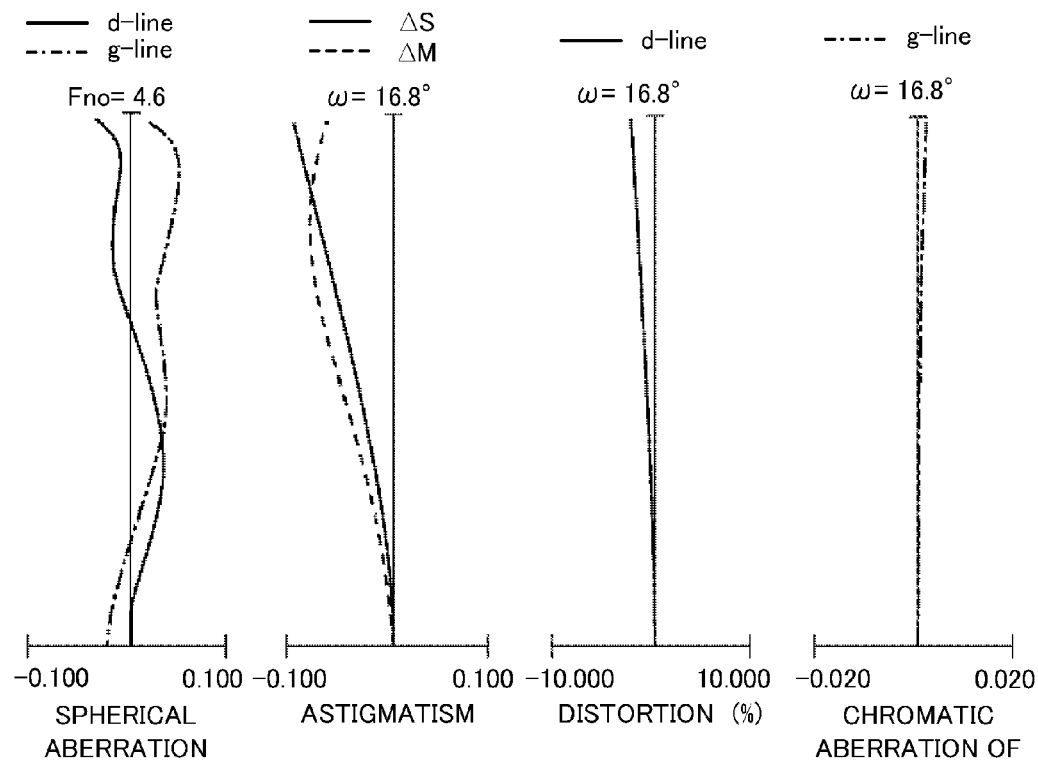
Figure 20C:
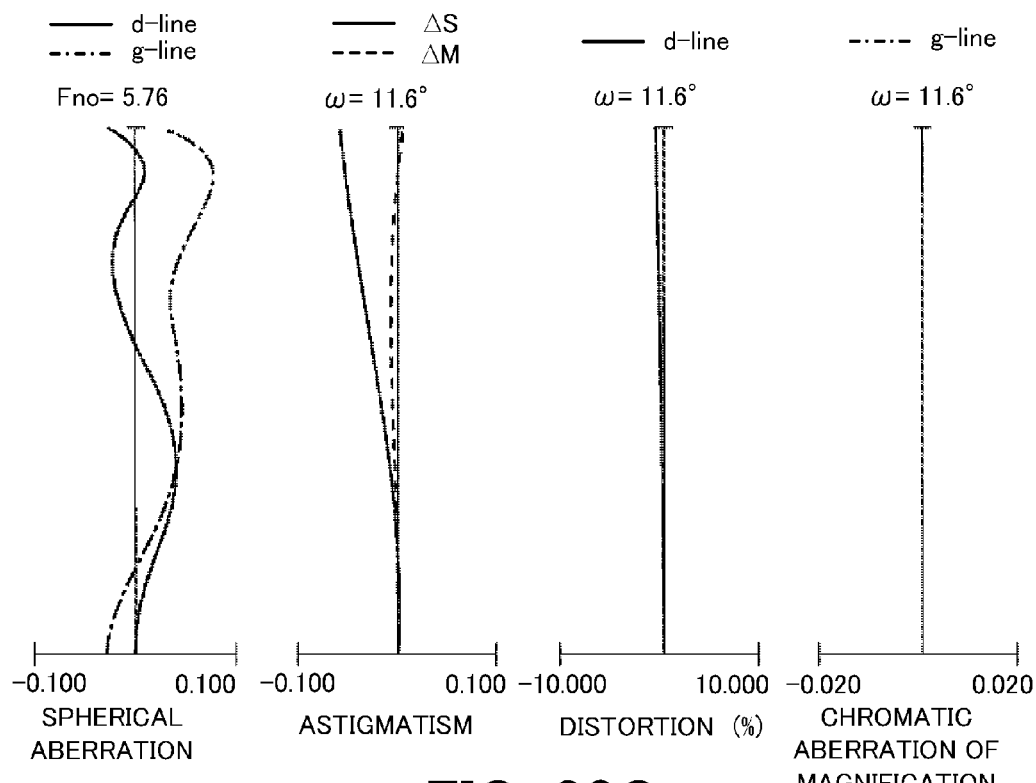

FIG. 19 is a cross-sectional diagram of a zoom lens at a wide-angle end in Embodiment 10 of the present invention. FIGS. 20A to 20C are aberration diagrams of the zoom lens of Embodiment 10 at a wide-angle end, at an intermediate zoom position, and at a telephoto end, respectively.

Figure 21:
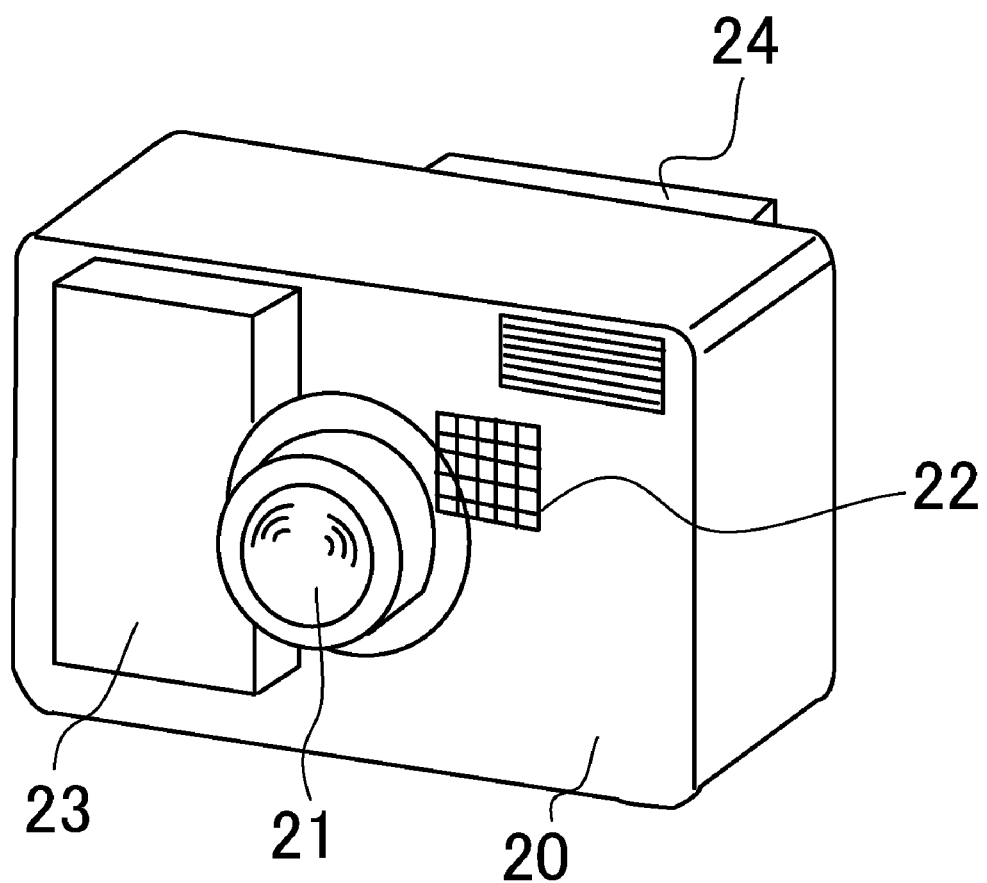
FIG. 21 is a schematic diagram of a main part of an image pickup apparatus in the present invention.

FIG. 21 is a schematic diagram of a main part of a camera (an image pickup apparatus) including the zoom lens of the present invention.

The zoom lens of each embodiment is an imaging lens system which is used for an image pickup apparatus such as a video camera, a digital camera, a silver salt film camera, or a TV camera.

In the cross-sectional diagrams of the zoom lens, the left hand is at an object side (at a front side) and the right hand is at an image side (at a rear side). Further, in the cross-sectional diagrams of the zoom lens, when "i" denotes an order of a lens group from the object side, "Li" indicates an i-th lens group. "G" denotes an optical block corresponding to an optical filter, a face plate, a low-pass filter, an infrared cut filter, or the like.

"IP" denotes an image plane. The image plane IP corresponds to an imaging surface of a solid-state imaging element (a photoelectric conversion element) such as a CCD sensor or a CMOS sensor when the zoom lens of each embodiment is used as an image pickup optical system of the video camera or the digital camera. The image plane IP corresponds to a film surface when the zoom lens of each embodiment is used as an image pickup optical system of the silver salt film camera.

An arrow indicates a movement locus of each lens group during a zooming operation (during a magnification varying operation) from the wide-angle end to the telephoto end.

In the aberration diagrams, "d" and "g" denote d-line and g-line, respectively. "ΔM" and "ΔS" denote meridional image plane and sagittal image plane, respectively. A chromatic aberration of magnification is represented by the g-line. "ω" denotes a half field angle, and "Fno" denotes an F-number.

In each embodiment, the wide-angle end and the telephoto end are defined as zoom positions when the magnification varying lens group is structurally positioned at both ends in a range movable on an optical axis.

The zoom lens of each embodiment is constituted by a first lens group L1 having a negative refractive power and a second lens group L2 having a positive refractive power in order from the object side to the image side, and an interval between the first lens group L1 and the second lens group L2 changes during the zooming operation.

Specifically, during the zooming operation from the wide-angle end to the telephoto end, the first lens group L1 moves to the image side while tracing a convex locus, and the second lens group L2 uniformly moves to the object side.

The first lens group L1 is, in order from the object side to the image side, constituted by two lenses of a negative lens G1n having both lens surfaces of concave shapes and a positive lens G1p having a lens surface at the object side of a convex shape protruded to the object side, and the negative lens G1n and the positive lens G1p are arranged at intervals.

The first lens group L1 is constituted by two lenses which are arranged at intervals to correct a field curvature and a chromatic aberration of magnification and also to reduce the thickness of the first lens group L1.

The second lens group L2 is constituted by three lenses including a positive lens and a negative lens in order from the object side to the image side.

The second lens group L2 that is a magnification varying lens group is constituted by the three lenses including the positive lens and the negative lens to reduce the variation of a field curvature and a coma aberration caused by varying the magnification and also to reduce the thickness of the second lens group L2.

However, with regard to a cemented lens, each lens to be cemented is counted as one. Further, an aspherical lens (a compound aspherical lens) which is formed by molding resin on a surface of a spherical surface is counted as one lens.

The zoom lens of each embodiment is constituted by five lenses as a whole, and the reduction of the size of a whole lens system is achieved.

In each embodiment, a radius of curvature of a lens surface at the object side of the negative lens included in the first lens group L1 is defined as R1na. A radius of curvature of a lens surface at the object side of the negative lens having the maximum refractive power included in the second lens group L2 is defined as R2na. A radius of curvature of a lens surface at the image side of the negative lens having the maximum refractive power included in the second lens group L2 is defined as R2nb. A focal length of the second lens group is defined as f2. A focal length at the wide-angle end of the whole lens system is defined as fw. In this case, the following Conditional expressions (1) to (3) are satisfied.

$$-24.0 < R1na/fw < -1.0 \quad (1)$$

$$0.2 < (R2na+R2nb)/(R2na-R2nb) < 2.2 \quad (2)$$

$$1.2 < f2/fw < 1.8 \quad (3)$$

Conditional expression (1) relates to a radius of curvature of a lens surface at the object side of the negative lens G1n included in the first lens group L1. In a two group zoom lens which is constituted by the first lens group L1 having the negative refractive power and the second lens group L2 having the positive refractive power in order from the object side to the image side, the height of a paraxial chief ray which enters the first lens group L1 significantly changes from the wide-angle end to the telephoto end. Therefore, in order to reduce the variation of the field curvature caused by the zooming operation, the field curvature needs to be sufficiently corrected in the first lens group L1.

Therefore, the negative refractive power is given to the lens surface at the object side of the negative lens G1n which constitutes the first lens group L1 and the refractive power of the negative lens is shared by the lens surfaces at the object side and at the image side to realize a lens configuration which prevents the generation of the field curvature in the first lens group L1. Further, the lens surface at the object side of the negative lens G1n has a concave shape to increase the negative refractive power and an entrance pupil position is displaced to the object side to reduce a lens effective diameter. In other words, the lens surface at the object side of the negative lens G1n is configured so as to satisfy Conditional expression (1) to reduce the variation of the field curvature caused by the magnification varying operation and to reduce the lens effective diameter.

If Conditional expression (1) exceeds the upper limit, a distortion aberration increases and the field curvature is excessively corrected at the wide-angle end because the curvature of the lens surface at the object side of the negative lens G1n is too strong. On the other hand, if Conditional expression (1) exceeds the lower limit, it is not good because the lens effective diameter increases and the field curvature has a shortage of the correction at the wide-angle end, and as a result it is difficult to correct the variation of the field curvature caused by the zooming operation.

Conditional expression (2) relates to a lens shape of the negative lens G2n having the maximum refractive power which constitutes the second lens group L2. The negative lens G2n has a lens shape in which a strong concave surface faces the image side to prevent the generation of the field curvature or the coma aberration on each lens surface of the negative lens G2n and further to reduce the deterioration of the optical performance caused by the eccentricity of the lens surface.

If Conditional expression (2) exceeds the upper limit, it is difficult to correct the coma aberration generated on the lens surface because the radius of curvature of the lens surface at the image side of the negative lens G2n is too strong. On the other hand, if Conditional expression (2) exceeds the lower limit, it is not good because the field curvature and the coma aberration generated on the lens surface at the object side of the negative lens G2n increase and the aberration is corrected by the cancellation with an aberration generated on the lens surface at the image side of the negative lens G2n and therefore the influence on the optical performance when the lens surface is decentered is large.

Conditional expression (3) defines a focal length of the second lens group L2. The second lens group L2 is set to a focal length which satisfies Conditional expression (3) to correct the coma aberration in the whole zoom range and also to achieve the whole lens system.

If Conditional expression (3) exceeds the upper limit, a moving amount of the second lens group L2 required for varying the magnification increases and the size of the whole lens system becomes large because the focal length of the second lens group L2 is too long. On the other hand, if Conditional expression (3) exceeds the lower limit, it is not good because the focal length of the second lens group L2 is too short and it is difficult to correct the coma aberration in the whole zoom range.

In each embodiment, preferably, numerical ranges of Conditional expressions (1) to (3) are set as follows.

$$-24.0 < R1na/fw < -1.5 \quad (1a)$$

$$0.25 < (R2na+R2nb)/(R2na-R2nb) < 2.15 \quad (2a)$$

$$1.3 \leq f2/fw < 1.7 \quad (3a)$$

In each embodiment, more preferably, numerical ranges of Conditional expressions (1a) to (3a) are set as follows.

$$-24.0 < R1na/fw < -2.0 \quad (1b)$$

$$0.30 < (R2na+R2nb)/(R2na-R2nb) < 2.13 \quad (2b)$$

$$1.4 \leq f2/fw < 1.6 \quad (3b)$$

As described above, each embodiment of the present invention optimizes the lens configuration of the first lens group L1 and the second lens group L2 in a negative-lead type two group zoom lens. Thus, a zoom lens which is thin when retracted and has well corrected the field curvature, the coma aberration, or the like in the whole zoom range, and has high optical characteristics of a zoom ratio of around 3 is obtained.

In the zoom lens of each embodiment, more preferably, at least one of the following conditional expressions is satisfied. According to this, the effect corresponding to each Conditional expression can be obtained.

A radius of curvature of the lens surface at the image side of the negative lens which constitutes the first lens group L1 is defined as R1nb. A radius of curvature of the lens surface at the object side of the positive lens which constitutes the first lens group L1 is defined as R1pa. A focal length of the negative lens having the maximum refractive power which constitutes the second lens group L2 is defined as f2n. A focal length of the first lens group L1 and a focal length of the second lens group L2 are defined as f1 and f2, respectively. In this case, preferably, at least one of the following Conditional expressions (4) to (8) is satisfied.

$$0.2 < (R1na+R1nb)/(R1na-R1nb) < 1.2 \quad (4)$$

$$-7.0 < (R1nb+R1pa)/(R1nb-R1pa) < -1.0 \quad (5)$$

$$0.3 < |f2n|/f2 < 1.6 \quad (6)$$

$$1.0 < |f1|/f2 < 1.8 \quad (7)$$

$$1.6 < |f1|/fw < 2.5 \quad (8)$$

Next, a technical sense of each conditional expression will be described.

Conditional expression (4) relates to a lens shape of the negative lens G1n of the first lens group L1, and relates to a share of the refractive powers of the lens surfaces at the object side and at the image side. The zoom variation of the field curvature can be well corrected if Conditional expression (4) is satisfied.

If Conditional expression (4) exceeds the upper limit, it is not good because the refractive power shared by the lens surface at the object side is too small and therefore the field curvature is excessively corrected at the wide-angle end. On the other hand, if Conditional expression (4) exceeds the lower limit, it is not good because the field curvature has a shortage of the correction at the wide-angle end.

Conditional expression (5) relates to a shape of an air lens G1A formed by the negative lens G1n and the positive lens G1p of the first lens group L1. The air lens G1A of the first lens group L1 has a shape which satisfies Conditional expression (5) to well correct the zoom variation of the chromatic aberration of magnification.

If Conditional expression (5) exceeds the upper limit, the chromatic aberration of magnification is excessively corrected at the wide-angle end. On the other hand, if Conditional expression (5) exceeds the lower limit, it is not good because the chromatic aberration of magnification has a shortage of the correction at the wide-angle end.

Conditional expression (6) relates to a focal length of the negative lens G2n having the maximum refractive power which constitutes the second lens group L2. The negative lens G2n having the maximum refractive power of the second lens group L2 is set to a focal length satisfying Conditional expression (6) to correct the spherical aberration and the chromatic aberration in the second lens group L2 in a balanced manner.

If Conditional expression (6) exceeds the upper limit, the spherical aberration and the on-axis chromatic aberration have shortages of the correction because the focal length of the negative lens G2n is too long. On the other hand, if Conditional expression (6) exceeds the lower limit, it is not good because the focal length of the negative lens G2n is too short and therefore the spherical aberration and the on-axis chromatic aberration are excessively corrected.

Conditional expression (7) defines a ratio of focal lengths of the first lens group L1 and the second lens group L2. The focal lengths of the first and second lens groups L1 and L2 which constitute the zoom lens are set to a power arrangement which satisfies Conditional expression (7) to obtain a small-sized zoom lens having a zoom ratio of around 3 and also having good optical characteristics in the whole zoom range.

If Conditional expression (7) exceeds the upper limit, the lens effective diameter increases and the whole lens system becomes large or the correction of the coma aberration in the whole zoom range is difficult because the focal length of the first lens group L1 is too long with respect to the focal length of the second lens group L2. On the other hand, if Conditional expression (7) exceeds the lower limit, it is not good because the focal length of the first lens group L1 is too short with respect to the focal length of the second lens group L2 and therefore the correction of the field curvature in the whole zoom range is difficult or the moving amount of the second lens group L2 for varying the magnification increases to result in getting larger.

Conditional expression (8) defines the focal length of the first lens group L1, and is a condition for correcting the zoom variation of the field curvature and also for achieving the size reduction of the whole lens system.

If Conditional expression (8) exceeds the upper limit, the lens effective diameter increases and the whole lens system becomes large because the focal length of the first lens group L1 is too large. On the other hand, if Conditional expression (8) exceeds the lower limit, it is not good because the focal length of the first lens group L1 is too small and therefore it is difficult to correct the field curvature in the whole zoom range.

In each embodiment, the second lens group L2 is configured to have at least one air lens, i.e. configured to be arranged at lens intervals. Thus, the degree of freedom for correcting aberrations in the second lens group L2 increases to well correct the coma aberration in the whole zoom range.

In each embodiment, a positive lens G21 arranged at a side closest to the object of the second lens group L2 is provided with both surfaces having aspherical shapes. Thus, the spherical aberration and the coma aberration are well corrected in the whole zoom range.

In each embodiment, a lens surface at the image side of the negative lens G2n having the maximum refractive power which is contained in the second lens group L2 has an aspherical shape where the negative refractive power increases with increasing distance from an optical axis to its periphery. According to the configuration, it is easy to well correct the coma aberration generated at an off-axis location where the image height is large in the whole zoom range.

In Embodiments 1 to 5, the second lens group L2 is constituted by a positive lens, a negative lens, and a positive lens, in order from the object side. The second lens group L2 that is a magnification varying lens group is a triplet type to prevent an asymmetric aberration such as a coma aberration generated by the magnification varying lens group.

In Embodiments 1 to 5, a positive lens G23 which is arranged at a side closest to the image of the second lens group L2 is configured by a meniscus shape in which a convex surface faces the image side. The configuration does not throw up a light beam emitted from the second lens group L2 to be able to correct the coma aberration remaining in the zooming operation and to well correct an eccentric coma aberration which is generated when performing a vibration isolation using the second lens group L2.

In Embodiments 6 to 8, the second lens group L2 is constituted by a positive lens, a positive lens, and a negative lens, in order from the object side. The second lens group L2 has a telephoto configuration of positive, positive, and negative lenses to arrange a main plane surface at the object side of the second lens group L2 at a position closer to the object side. The field curvature and the coma aberration in the whole zoom range can be well corrected because an interval between a main plane surface at the image side of the first lens group L1 and a main plane surface at the object side of the second lens group L2 can be shortened at the telephoto end and the refractive power of the second lens group L2 can be reduced.

In Embodiments 9 to 10, the second lens group L2 is constituted by a positive lens, a negative lens, and a negative lens, in order from the object side. The second lens group L2 has a telephoto configuration to arrange a main plane surface at the object side of the second lens group L2 at a position closer to the object side. The field curvature and the coma aberration in the whole zoom range can be well corrected because an interval between a main plane surface at the image side of the first lens group L1 and a main plane surface at the object side of the second lens group L2 can be shortened at the telephoto end and the refractive power of the second lens group L2 can be reduced.

In each embodiment, preferably, numerical ranges of Conditional expressions (4) to (8) are set as follows.

$$0.25<(R1na+R1nb)/(R1na-R1nb)<1.1 \quad (4a)$$

$$-6.0<(R1nb+R1pa)/(R1nb-R1pa)<-1.2 \quad (5a)$$

$$0.4<|f2n|/f2<1.5 \quad (6a)$$

$$1.05<|f1|/f2<1.7 \quad (7a)$$

$$1.7<|f1|/fw<2.4 \quad (8a)$$

In each embodiment, more preferably, numerical ranges of Conditional expressions (4a) to (8a) are set as follows.

$$0.3<(R1na+R1nb)/(R1na-R1nb)<1.0 \quad (4b)$$

$$-5.0<(R1nb+R1pa)/(R1nb-R1pa)<-1.5 \quad (5b)$$

$$0.5<|f2n|/f2<1.4 \quad (6b)$$

$$1.1<|f1|/f2<1.6 \quad (7b)$$

$$1.75<|f1|/fw<2.35 \quad (8b)$$

As described above, according to each embodiment, a negative-lead type two group zoom lens which has a zoom ratio of around three times, is thin when retracted, well corrects the field curvature and the coma aberration in particular in the whole zoom range, and has good optical characteristics, is obtained.

Next, features of the lens configuration of each embodiment will be described. Hereinafter, the lens configuration will be described in order from the object side to the image side.

First, referring to FIG. 1, a zoom lens of Embodiment 1 of the present invention will be described.

In Embodiment 1 of FIG. 1, in a zooming operation from the wide-angle end to the telephoto end, the first lens group L1 moves to the object side tracing a locus of a convex shape as indicated by an arrow to compensate the variation of the image plane caused by the magnification varying operation. The second lens group L2 is a magnification varying lens group and uniformly moves to the object side.

A focusing operation from an infinite object to a finite distance object is performed by moving the first lens group L1 on an optical axis.

The first lens group L1 is constituted by two lenses of a negative lens G1n having a lens surface at the image side which has an aspherical shape and having a biconcave shape, and a positive lens G1p having a lens surface at the object side which has an aspherical shape and having a meniscus shape. The lens configuration enables the lens effective diameter to be reduced and corrects the zoom variation of the field curvature.

The second lens group L2 is constituted by three lenses of a positive lens G21 whose both lens surfaces have aspherical shapes and a biconcave shape, a negative lens G2n having a lens surface at the image side which has an aspherical shape and having a meniscus shape whose convex surface faces the object side, and a positive lens G23 having a meniscus shape whose concave surface faces the object side. The second lens group L2 is a triplet type having positive, negative, and positive lenses to reduce an asymmetric aberration generated by a magnification varying lens group and to well correct the field curvature, the coma aberration, or the like, in the whole zoom range.

Referring to FIG. 3, a zoom lens of Embodiment 2 of the present invention will be described.

In Embodiment 2 of FIG. 3, a zoom type and a focus mode are the same as those of Embodiment 1 of FIG. 1. As compared with Embodiment 1, a lens shape of each lens group is different.

The first lens group L1 is constituted by two lenses of a negative lens G1n having a lens surface at the image side which has an aspherical shape and having a biconcave shape, and a positive lens G1p having a meniscus shape whose convex surface faces the object side.

The second lens group L2 is constituted by three lenses of a positive lens G21 having both lens surfaces of aspherical shapes and a meniscus shape, a negative lens G2n having a lens surface at the image side of an aspherical shape and having a meniscus shape where a convex surface faces the object side, and a positive lens G23 having a meniscus shape where a concave surface faces the object side.

Referring to FIG. 5, a zoom lens of Embodiment 3 of the present invention will be described.

In Embodiment 3 of FIG. 5, a zoom type and a focus mode are the same as those of Embodiment 1 of FIG. 1. As compared with Embodiment 1, a lens shape of each lens group is different.

The first lens group L1 is constituted by two lenses of a negative lens G1n having a biconcave shape and a positive lens G1p having a lens surface at the object side which has an aspherical shape and having a meniscus shape whose convex surface faces the object side.

The second lens group L2 is constituted by three lenses of a positive lens G21 having both lens surfaces of aspherical shapes and having a biconvex shape, a negative lens G2n having a lens surface at the image side of an aspherical shape and having a biconcave shape, and a positive lens G23 having a meniscus shape whose concave surface faces the object side.

Referring to FIG. 7, a zoom lens of Embodiment 4 of the present invention will be described.

In Embodiment 4 of FIG. 7, a zoom type and a focus mode are the same as those of Embodiment 1 of FIG. 1. As compared with Embodiment 1, a lens shape of each lens group is different.

The first lens group L1 is constituted by two lenses of a negative lens G1n having a lens surface at the image side of a compound aspherical surface and having a biconcave shape and a positive lens G1p having a meniscus shape whose convex surface faces the object side.

The second lens group L2 is constituted by three lenses of a positive lens G21 having both lens surfaces of aspherical shapes and having a biconvex shape, a negative lens G2n having a lens surface at the object side and having a biconcave shape, and a positive lens G23 having a meniscus shape where a concave shape faces the object side.

Referring to FIG. 9, a zoom lens of Embodiment 5 of the present invention will be described.

In Embodiment 5 of FIG. 9, a zoom type, a basic lens configuration, and a focus mode are the same as those of Embodiment 1 of FIG. 1. As compared with Embodiment 1, a lens shape of each lens group is different.

The first lens group L1 is constituted by two lenses of a negative lens G1n having a lens surface at the image side of a compound aspherical surface and having a biconcave shape and a positive lens G1p having a meniscus shape where a convex surface faces the object side.

The second lens group L2 is constituted by three lenses of a positive lens G21 having both lens surfaces of aspherical shapes and having a biconvex shape, a negative lens G2n having a lens surface at the image side of an aspherical shape and having a biconcave shape, and a positive lens G23 having a meniscus shape where a concave surface faces the object side.

Referring to FIG. 11, a zoom lens of Embodiment 6 of the present invention will be described.

In Embodiment 6 of FIG. 11, a zoom type and a focus mode are the same as those of Embodiment 1 of FIG. 1. As compared with Embodiment 1, the configuration of the second lens group L2 is different.

The first lens group L1 is constituted by two lenses of a negative lens G1n having a lens surface at the image side of an aspherical surface and having a biconcave shape and a positive lens G1p having a lens surface at the object side of an aspherical shape and having a biconvex shape.

The second lens group L2 is constituted by a total of three lenses of a positive lens G21 having both lens surfaces of aspherical shapes and having a biconvex shape, a positive lens G22 having a biconvex shape, and a negative lens G2n having a lens surface at the image side of an aspherical shape and having a biconcave shape, where the positive lens G22 and the negative lens G2n constitute a cemented lens. The second lens group has a telephoto configuration of positive, positive, and negative lenses to arrange a main plane surface at the object side of the second lens group L2 at a position closer to the object side. An interval between a main plane surface at the image side of the first lens group L1 and a main plane surface at the object side of the second lens group L2 is shortened at the telephoto end to reduce the refractive power of the second lens group and to well correct the field curvature and the coma aberration in the whole zoom range.

Referring to FIG. 13, a zoom lens of Embodiment 7 of the present invention will be described.

In Embodiment 7 of FIG. 13, a zoom type, a basic lens configuration, and a focus mode are the same as those of Embodiment 6 of FIG. 11. As compared with Embodiment 6, a lens shape of each lens group is different.

The first lens group L1 is constituted by two lenses of a negative lens G1n having a lens surface at the image side of an aspherical shape and having a biconcave shape, and a positive lens G1p having a lens surface at the object side of an aspherical shape and having a meniscus shape where a convex surface faces the object side.

The second lens group L2 is constituted by three lenses of a positive lens G21 having both lens surfaces of aspherical shapes and having a meniscus shape where a convex surface faces the object side, a positive lens G22 having a biconvex shape, and a negative lens G2n having a lens surface at the image side of an aspherical shape and having a meniscus shape where a convex surface faces the object side.

Referring to FIG. 15, a zoom lens of Embodiment 8 of the present invention will be described.

In Embodiment 8 of FIG. 15, a zoom type, a basic lens configuration, and a focus mode are the same as those of Embodiment 6 of FIG. 11. As compared with Embodiment 6, a lens shape of each lens group is different.

The first lens group L1 is constituted by two lenses of a negative lens G1n having a lens surface at the image side of an aspherical shape and having a biconcave shape, and a positive lens G1p having a meniscus shape where a convex surface faces the object side.

The second lens group L2 is constituted by three lenses of a positive lens G21 having both lens surfaces of aspherical shapes and having a biconvex shape, a positive lens G22 having a meniscus shape where a concave surface faces the object side, a negative lens G2n having a lens surface at the image side of an aspherical shape and having a meniscus shape where a concave surface faces the object side.

Referring to FIG. 17, a zoom lens of Embodiment 9 of the present invention will be described.

In Embodiment 9 of FIG. 17, a zoom type and a focus mode are the same as those of Embodiment 1 of FIG. 1. As compared with Embodiment 1, the configuration of the second lens group L2 is different.

The first lens group L1 is constituted by two lenses of a negative lens G1n having a lens surface at the image side of an aspherical surface and having a biconcave shape, and a positive lens G1p having a biconvex shape.

The second lens group L2 is constituted by three lenses of a positive lens G21 having both lens surfaces of aspherical shapes and having a biconvex shape, a negative lens G22 having a meniscus shape where a concave surface faces the object side, a negative lens G2n having a lens surface at the image side of an aspherical shape and having a meniscus shape where a convex surface faces the object side. The second lens group has a telephoto configuration of positive, negative, and negative lenses to arrange a main plane surface at the object side of the second lens group L2 at a position closer to the object side. An interval between a main plane surface at the image side of the first lens group L1 and a main plane surface at the object side of the second lens group L2 is shortened to reduce the refractive power of the second lens group and to well correct the field curvature and the coma aberration in the whole zoom range.

Referring to FIG. 19, a zoom lens of Embodiment 10 of the present invention will be described.

In Embodiment 10 of FIG. 19, a zoom type, a basic lens configuration, and a focus mode are the same as those of Embodiment 9 of FIG. 17. As compared with Embodiment 9, a lens shape of each lens group is different.

The first lens group L1 is constituted by two lenses of a negative lens G1n having a lens surface at the image side and having a biconcave shape and a positive lens G1p having a biconvex shape.

The second lens group L2 is constituted by three lenses of a positive lens G21 having both lens surfaces of aspherical shapes and having a biconvex shape, a negative lens G22 having a meniscus shape where a concave surface faces the object side, and a negative lens G2n having a lens surface at the image side of an aspherical shape and having a meniscus shape where a convex surface faces the object side.

In each embodiment, any of lens groups or partial lens groups may be moved in a direction perpendicular to an optical axis to compensate the movement of an image generated by a hand shake. In this case, it is preferable that the second lens group L2 is an anti-shake lens group.

If a solid-state image pickup element is used, a distortion aberration remaining in the zoom lens can be electronically corrected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Hereinafter, specific numerical data of Numerical embodiments 1 to 10 which correspond to Embodiment 1 to 10 respectively will be indicated. In each numerical embodiment, reference code "i" indicates a number of a surface which is counted in order from the object side. Reference code "ri" denotes a radius of curvature of an i-th optical surface (an i-th surface). Reference code "di" denotes an on-axis interval between the i-th surface and the (i+1)-th surface. Reference code "ndi" and "vdi" denote a refractive index and Abbe number of a material of the i-th optical member with respect to a d-line, respectively. Reference codes "f", "Fno", and "ω" denote a focal length, an F-number, and a half field angle, respectively.

In each numerical embodiment, final two surfaces correspond to a glass block G.

In aspherical shapes, a travel direction of light is defined as a positive direction, "x" is a displacement from a top surface in an optical axis direction, "h" is a height from the optical axis in a direction perpendicular to the optical axis, "R" is a paraxial radius of curvature, "k" is a conic constant, and B, C, D, and E are aspherical shapes. In this case, "x" is represented by the following expression.

$$x = (h^2/R)/[1+\{1-(1+k)*(h/R)2\}^{1/2}] + B*h4 + C*h6 + D*h8 + E*h10$$

"E±XX" in each aspherical surface coefficient means "×10±XX".

The relationships between each conditional expression as described above and numerical embodiments are shown in Table 1.

Numerical Embodiment 1

Unit mm

Surface data

| Surface number | r | d | nd | vd | Effective diameter |
|---|---|---|---|---|---|
| 1 | −42.804 | 1.00 | 1.86400 | 40.6 | 8.87 |
| 2* | 7.144 | 1.68 | | | 7.77 |
| 3* | 13.361 | 1.70 | 1.92110 | 22.4 | 8.01 |
| 4 | 55.360 | (variable) | | | 7.74 |
| 5* | 4.900 | 1.90 | 1.76802 | 49.2 | 4.60 |
| 6* | −98.800 | 0.13 | | | 4.08 |
| 7 | 38.880 | 0.90 | 1.84666 | 23.8 | 3.98 |
| 8* | 5.665 | 0.60 | | | 3.62 |
| 9 | −11.172 | 0.70 | 1.59201 | 67.0 | 3.62 |
| 10 | −5.927 | (variable) | | | 3.69 |
| 11 | ∞ | 1.94 | 1.51633 | 64.1 | 10.00 |
| 12 | ∞ | | | | 10.00 |
| Image surface | ∞ | | | | |

Aspherical surface data

Second surface

K = 4.02199e−001 A 4 = −1.41178e−004 A 6 = −1.83832e−006
A 8 = −1.15962e−007 A10 = −1.27363e−008

Third surface

K = −5.26684e+000 A 4 = 4.03541e−004 A 6 = 1.47163e−006
A 8 = −1.20687e−007 A10 = 1.06321e−010

Fifth surface

K = 1.29692e−002 A 4 = 3.15179e−004 A 6 = 4.74600e−005
A 8 = −1.50081e−006 A10 = 2.97778e−007

Sixth surface

K = 0.00000e+000 A 4 = 2.35966e−003 A 6 = −1.91681e−005

Eighth surface

K = −6.71535e−001 A 4 = 5.34148e−004 A 6 = 1.62007e−004
A 8 = −1.11914e−006 A10 = 1.92201e−006

Various data
Magnification varying ratio 2.85

| | wide-angle | Intermediate | Telephoto |
|---|---|---|---|
| Focal length | 6.45 | 12.42 | 18.38 |
| F-number | 3.29 | 4.44 | 5.60 |
| Field angle | 31.03 | 17.35 | 11.92 |
| Image height | 3.88 | 3.88 | 3.88 |
| Total lens length | 33.29 | 28.52 | 29.77 |
| BF | 1.00 | 1.00 | 1.00 |
| d4 | 12.73 | 3.45 | 0.20 |
| d10 | 9.00 | 13.51 | 18.01 |
| Entrance pupil position | 6.68 | 4.10 | 2.52 |
| Exit pupil position | −13.15 | −17.66 | −22.16 |
| Front principal point position | 10.19 | 8.25 | 6.32 |
| Rear principal point position | −5.45 | −11.42 | −17.38 |

-continued

Unit mm

Zoom lens group data

| Group | Start Surface | Focal length | Lens length | Front principal point position | Rear principal point position |
|---|---|---|---|---|---|
| 1 | 1 | −12.84 | 4.38 | −0.56 | −3.85 |
| 2 | 5 | 9.70 | 4.23 | −0.43 | −3.28 |
| 3 | 11 | ∞ | 1.94 | 0.64 | −0.64 |

Single lens data

| Lens | Start surface | Focal length |
|---|---|---|
| 1 | 1 | −7.02 |
| 2 | 3 | 18.76 |
| 3 | 5 | 6.13 |
| 4 | 7 | −7.93 |
| 5 | 9 | 20.31 |

Numerical Embodiment 2

Unit mm

Surface data

| Surface number | r | d | nd | vd | Effective diameter |
|---|---|---|---|---|---|
| 1 | −20.865 | 1.00 | 1.86400 | 40.6 | 9.80 |
| 2* | 6.214 | 0.77 | | | 8.81 |
| 3 | 9.870 | 1.80 | 2.09500 | 29.4 | 9.04 |
| 4 | 102.601 | (variable) | | | 8.87 |
| 5* | 4.816 | 1.80 | 1.76802 | 49.2 | 4.38 |
| 6* | 51.668 | 0.10 | | | 3.87 |
| 7 | 21.589 | 0.90 | 1.92110 | 22.4 | 3.81 |
| 8* | 6.046 | 0.58 | | | 3.43 |
| 9 | −11.187 | 0.70 | 1.48749 | 70.2 | 3.40 |
| 10 | −5.228 | (variable) | | | 3.42 |
| 11 | ∞ | 1.94 | 1.51633 | 64.1 | 10.00 |
| 12 | ∞ | | | | 10.00 |
| Image surface | ∞ | | | | |

Aspherical surface data

Second surface $K = -2.25651e-001\ A4 = -3.28056e-004\ A6 = -3.13875e-006$
$A8 = -1.53632e-007\ A10 = 2.30730e-010$ Firth surface $K = 5.94488e-002\ A4 = 3.67334e-004\ A6 = 5.51211e-005$
$A8 = -9.35134e-007\ A10 = -8.30900e-008$ Sixth surface $K = 3.23201e+002\ A4 = 2.22867e-003\ A6 = -2.41249e-005$
$A8 = -3.15833e-006\ A10 = -8.97026e-007$ Eighth surface $K = 6.17973e-001\ A4 = -1.69513e-004\ A6 = 1.26739e-004$
$A8 = 1.68379e-005\ A10 = -1.48098e-006$ Various data
Magnification varying ratio 2.82

| | wide-angle | Intermediate | Telephoto |
|---|---|---|---|
| Focal length | 6.45 | 12.32 | 18.20 |
| F-number | 3.29 | 4.41 | 5.54 |
| Field angle | 31.00 | 17.45 | 12.02 |
| Image height | 3.88 | 3.88 | 3.88 |
| Total lens length | 33.71 | 26.90 | 26.98 |
| BF | 0.61 | 0.61 | 0.61 |

-continued

Unit mm

| | | | |
|---|---|---|---|
| d4 | 14.55 | 3.88 | 0.10 |
| d10 | 8.95 | 12.81 | 16.67 |
| Entrance pupil position | 7.27 | 3.96 | 1.85 |
| Exit pupil position | −13.02 | −16.88 | −20.74 |
| Front principal point position | 10.67 | 7.60 | 4.54 |
| Rear principal point position | −5.84 | −11.71 | −17.59 |

Zoom lens group data

| Group | Start Surface | Focal length | Lens length | Front principal point position | Rear principal point position |
|---|---|---|---|---|---|
| 1 | 1 | −14.83 | 3.57 | −0.79 | −3.11 |
| 2 | 5 | 9.74 | 4.08 | −0.36 | −3.13 |
| 3 | 11 | ∞ | 1.94 | 0.64 | −0.64 |

Single lens data

| Lens | Start surface | Focal length |
|---|---|---|
| 1 | 1 | −5.45 |
| 2 | 3 | 9.87 |
| 3 | 5 | 6.80 |
| 4 | 7 | −9.38 |
| 5 | 9 | 19.39 |

Numerical Embodiment 3

Unit mm

Surface data

| Surface number | r | d | nd | vd | Effective diameter |
|---|---|---|---|---|---|
| 1 | −98.995 | 0.70 | 1.90366 | 31.3 | 9.06 |
| 2 | 7.020 | 1.51 | | | 7.95 |
| 3* | 10.930 | 1.40 | 2.14352 | 17.8 | 8.12 |
| 4 | 22.217 | (variable) | | | 7.77 |
| 5* | 4.891 | 1.80 | 1.80610 | 40.4 | 4.37 |
| 6* | −10.415 | 0.06 | | | 3.94 |
| 7 | −16.162 | 1.00 | 1.83917 | 23.9 | 3.84 |
| 8* | 5.970 | 0.75 | | | 3.35 |
| 9 | −6.129 | 0.70 | 1.48749 | 70.2 | 3.34 |
| 10 | −4.268 | (variable) | | | 3.44 |
| 11 | ∞ | 1.94 | 1.51633 | 64.1 | 10.00 |
| 12 | ∞ | | | | 10.00 |
| Image surface | ∞ | | | | |

Aspherical surface data

Third surface $K = -1.69839e+000\ A4 = 2.32329e-004\ A6 = 7.87516e-007$
$A8 = 5.28903e-008\ A10 = -3.49647e-010$ Fifth surface $K = -1.64111e-002\ A4 = 2.67855e-004\ A6 = 5.67990e-005$
$A8 = -1.13576e-006\ A10 = 5.81917e-007$ Sixth surface $K = 0.00000e+000\ A4 = 2.23721e-003$ Eighth surface $K = -1.66762e-001\ A4 = 1.14342e-003\ A6 = 1.63248e-004$
$A8 = -1.56668e-005\ A10 = 5.16928e-006$ -continued Unit mm Various data
Magnification varying ratio 2.85

|  | wide-angle | Intermediate | Telephoto |
|---|---|---|---|
| Focal length | 6.45 | 12.42 | 18.38 |
| F-number | 3.29 | 4.43 | 5.60 |
| Field angle | 31.03 | 17.35 | 11.92 |
| Image height | 3.88 | 3.88 | 3.88 |
| Total lens length | 32.02 | 26.75 | 27.61 |
| BF | 1.00 | 1.00 | 1.00 |
| d4 | 12.93 | 3.51 | 0.20 |
| d10 | 8.23 | 12.39 | 16.54 |
| d12 | 1.00 | 1.00 | 1.00 |
| Entrance pupil position | 6.91 | 3.99 | 2.18 |
| Exit pupil position | −12.53 | −16.69 | −20.85 |
| Front principal point position | 10.29 | 7.69 | 5.10 |
| Rear principal point position | −5.45 | −11.42 | −17.38 |

Zoom lens group data

| Group | Start Surface | Focal length | Lens length | Front principal point position | Rear principal point position |
|---|---|---|---|---|---|
| 1 | 1 | −13.47 | 3.61 | −0.38 | −2.96 |
| 2 | 5 | 9.39 | 4.31 | −0.36 | −3.38 |
| 3 | 11 | ∞ | 1.94 | 0.64 | −0.64 |

Single lens data

| Lens | Start surface | Focal length |
|---|---|---|
| 1 | 1 | −7.23 |
| 2 | 3 | 17.65 |
| 3 | 5 | 4.36 |
| 4 | 7 | −5.09 |
| 5 | 9 | 25.68 |

Numerical Embodiment 4

Unit mm

Surface data

| Surface number | r | d | nd | vd | Effective diameter |
|---|---|---|---|---|---|
| 1 | −75.457 | 0.60 | 1.91900 | 35.8 | 9.01 |
| 2 | 7.149 | 0.10 | 1.52421 | 51.4 | 8.00 |
| 3* | 6.602 | 1.35 | | | 7.97 |
| 4 | 10.028 | 1.30 | 2.01960 | 21.5 | 8.13 |
| 5 | 25.787 | (variable) | | | 7.87 |
| 6* | 4.812 | 1.90 | 1.80139 | 45.5 | 4.39 |
| 7* | −18.302 | 0.06 | | | 3.89 |
| 8 | −189.394 | 0.90 | 1.84666 | 23.8 | 3.78 |
| 9* | 5.368 | 0.89 | | | 3.31 |
| 10 | −6.906 | 0.70 | 1.59201 | 67.0 | 3.30 |
| 11 | −4.982 | (variable) | | | 3.39 |
| 12 | ∞ | 1.94 | 1.51633 | 64.1 | 10.00 |
| 13 | ∞ | | | | 10.00 |
| Image surface | ∞ | | | | |

Aspherical surface data

Third surface $\kappa = -6.51078e-001$    $A4 = 5.99883e-006$    $A6 = 9.87589e-007$
$A8 = -9.60329e-008$    $A10 = 1.02367e-009$ Sixth surface $\kappa = -8.52860e-003$    $A4 = 1.93556e-004$    $A6 = 4.40058e-005$
$A8 = 5.23607e-008$    $A10 = 2.92166e-007$ -continued Unit mm Seventh surface $\kappa = 0.00000e+000$    $A4 = 2.05060e-003$ Ninth surface $\kappa = -6.22161e-001$    $A4 = 1.38996e-003$    $A6 = 1.75786e-004$
$A8 = -7.84165e-006$    $A10 = 4.46180e-006$ Various data
Zoom ratio 2.85

|  | wide-angle | Intermediate | Telephoto |
|---|---|---|---|
| Focal length | 6.45 | 12.42 | 18.38 |
| F-number | 3.29 | 4.44 | 5.60 |
| Field angle | 31.00 | 17.33 | 11.90 |
| Image height | 3.88 | 3.88 | 3.88 |
| Total lens length | 32.01 | 26.53 | 27.29 |
| BF | 0.50 | 0.50 | 0.50 |
| d5 | 13.19 | 3.57 | 0.20 |
| d11 | 8.58 | 12.71 | 16.84 |
| Entrance pupil position | 6.84 | 3.89 | 2.05 |
| Exit pupil position | −13.01 | −17.14 | −21.27 |
| Front principal point position | 10.21 | 7.56 | 4.92 |
| Rear principal point position | −5.95 | −11.92 | −17.88 |

Zoom lens group data

| Group | Start Surface | Focal length | Lens length | Front principal point position | Rear principal point position |
|---|---|---|---|---|---|
| 1 | 1 | −13.65 | 3.35 | −0.57 | −3.05 |
| 2 | 6 | 9.45 | 4.46 | −0.43 | −3.56 |
| 3 | 12 | ∞ | 1.94 | 0.64 | −0.64 |

Single lens data

| Lens | Start surface | Focal length |
|---|---|---|
| 1 | 1 | −7.08 |
| 2 | 2 | −175.92 |
| 3 | 4 | 15.45 |
| 4 | 6 | 4.93 |
| 5 | 8 | −6.15 |
| 6 | 10 | 26.61 |

Numerical Embodiment 5

Unit mm

Surface data

| Surface number | r | d | nd | vd | Effective diameter |
|---|---|---|---|---|---|
| 1 | −37.703 | 0.60 | 1.91900 | 35.8 | 9.13 |
| 2 | 7.285 | 0.17 | 1.52421 | 51.4 | 8.17 |
| 3* | 7.285 | 1.35 | | | 8.16 |
| 4 | 11.616 | 1.30 | 2.01960 | 21.5 | 8.39 |
| 5 | 40.523 | (variable) | | | 8.19 |
| 6* | 4.821 | 1.90 | 1.80139 | 45.5 | 4.21 |
| 7* | −19.121 | 0.11 | | | 3.80 |
| 8 | −177.727 | 0.90 | 1.84666 | 23.8 | 3.68 |
| 9* | 5.422 | 0.77 | | | 3.29 |
| 10 | −7.222 | 0.70 | 1.59201 | 67.0 | 3.31 |
| 11 | −5.131 | (variable) | | | 3.58 |
| 12 | ∞ | 1.94 | 1.51633 | 64.1 | 10.00 |
| 13 | ∞ | | | | 10.00 |
| Image surface | ∞ | | | | |

-continued

Unit mm

Aspherical surface data

Third surface

κ = −2.99139e−001  A4 = −2.09906e−004  A6 = −1.14452e−006
A8 = −4.24186e−008  A10 = −1.01305e−009

Sixth surface

κ = −3.54293e−002  A4 = 2.52651e−004  A6 = 3.28482e−005
A8 = 3.35529e−006  A10 = −1.99174e−009

Seventh surface

κ = 0.00000e+000  A4 = 2.05945e−003

Ninth surface

κ = −6.63664e−001  A4 = 1.38879e−003  A6 = 1.27948e−004
A8 = 1.06421e−005  A10 = 1.79907e−006

Various data
Magnification varying ratio 2.85

| | wide-angle | Intermediate | Telephoto |
|---|---|---|---|
| Focal length | 6.45 | 12.42 | 18.38 |
| F-number | 3.47 | 4.61 | 5.76 |
| Field angle | 31.03 | 17.35 | 11.92 |
| Image height | 3.88 | 3.88 | 3.88 |
| Total lens length | 31.61 | 26.72 | 27.79 |
| BF | 0.74 | 0.74 | 0.74 |
| d5 | 12.65 | 3.48 | 0.26 |
| d11 | 8.47 | 12.75 | 17.04 |
| Entrance pupil position | 6.49 | 3.76 | 2.09 |
| Exit pupil position | −12.77 | −17.05 | −21.34 |
| Front principal point position | 9.86 | 7.52 | 5.17 |
| Rear principal point position | −5.71 | −11.67 | −17.64 |

Zoom lens group data

| Group | Start Surface | Focal length | Lens length | Front principal point position | Rear principal point position |
|---|---|---|---|---|---|
| 1 | 1 | −13.10 | 3.42 | −0.70 | −3.28 |
| 2 | 6 | 9.40 | 4.38 | −0.55 | −3.54 |
| 3 | 12 | ∞ | 1.94 | 0.64 | −0.64 |

Single lens data

| Lens | Start surface | Focal length |
|---|---|---|
| 1 | 1 | −6.60 |
| 2 | 2 | 1726.21 |
| 3 | 4 | 15.62 |
| 4 | 6 | 4.98 |
| 5 | 8 | −6.20 |
| 6 | 10 | 26.62 |

Numerical Embodiment 6

Unit mm

Surface data

| Surface number | r | d | nd | vd | Effective diameter |
|---|---|---|---|---|---|
| 1 | −40.420 | 1.00 | 1.86400 | 40.6 | 8.99 |
| 2* | 5.205 | 1.60 | | | 7.42 |
| 3* | 17.424 | 1.50 | 1.90200 | 25.1 | 7.70 |
| 4 | −52.689 | (variable) | | | 7.61 |
| 5* | 3.740 | 1.80 | 1.59201 | 67.0 | 4.00 |
| 6* | −29.796 | 0.10 | | | 3.69 |
| 7 | 16.107 | 1.05 | 1.74400 | 44.8 | 3.53 |

-continued

Unit mm

| 8 | −36.974 | 0.50 | 1.75520 | 27.5 | 3.15 |
|---|---|---|---|---|---|
| 9* | 5.292 | (variable) | | | 2.83 |
| 10 | ∞ | 1.00 | 1.51633 | 64.1 | 10.00 |
| 11 | ∞ | | | | 10.00 |
| Image surface | ∞ | | | | |

Aspherical surface data

Second surface

κ = −7.50354e−001  A4 = 6.80714e−004  A6 = 1.26025e−004
A8 = −1.22116e−005  A10 = 2.98472e−007

Third surface

κ = 0.00000e+000  A4 = 5.92022e−004  A6 = 3.81647e−005
A8 = −3.43511e−006  A10 = 7.51687e−008

Fifth surface

κ = 0.00000e+000  A4 = −1.22588e−003  A6 = −1.85994e−005
A8 = −2.79059e−005  A10 = 8.39605e−007

Sixth surface

κ = 0.00000e+000  A4 = −1.98740e−003  A6 = 2.02827e−005

Ninth surface

κ = 0.00000e+000  A4 = 6.66263e−003  A6 = 6.30092e−004

Various data
Zoom ratio 2.83

| | wide-angle | Intermediate | Telephoto |
|---|---|---|---|
| Focal length | 5.15 | 9.87 | 14.59 |
| F-number | 3.33 | 4.54 | 5.76 |
| Field angle | 36.99 | 21.45 | 14.89 |
| Image height | 3.88 | 3.88 | 3.88 |
| Total lens length | 28.38 | 24.35 | 25.33 |
| BF | 0.99 | 0.99 | 0.99 |
| d4 | 11.46 | 3.73 | 1.00 |
| d9 | 7.38 | 11.09 | 14.80 |
| Entrance pupil position | 5.38 | 3.65 | 2.63 |
| Exit pupil position | −9.73 | −13.43 | −17.14 |
| Front principal point position | 8.06 | 6.77 | 5.48 |
| Rear principal point position | −4.16 | −8.89 | −13.61 |

Zoom lens group data

| Group | Start Surface | Focal length | Lens length | Front principal point position | Rear principal point position |
|---|---|---|---|---|---|
| 1 | 1 | −10.30 | 4.10 | −0.83 | −4.22 |
| 2 | 5 | 8.09 | 3.45 | −1.72 | −3.11 |
| 3 | 10 | ∞ | 1.00 | 0.33 | −0.33 |

Single lens data

| Lens | Start surface | Focal length |
|---|---|---|
| 1 | 1 | −5.28 |
| 2 | 3 | 14.67 |
| 3 | 5 | 5.73 |
| 4 | 7 | 15.21 |
| 5 | 8 | −6.10 |

Numerical Embodiment 7

Unit mm

Surface data

| Surface number | r | d | nd | vd | Effective diameter |
|---|---|---|---|---|---|

-continued

Unit mm

| | | | | | |
|---|---|---|---|---|---|
| 1 | −123.120 | 1.00 | 1.86400 | 40.6 | 8.94 |
| 2* | 4.844 | 1.60 | | | 7.22 |
| 3* | 10.481 | 1.50 | 2.01960 | 21.5 | 7.45 |
| 4 | 28.360 | (variable) | | | 7.15 |
| 5* | 4.770 | 1.20 | 1.55332 | 71.7 | 4.03 |
| 6* | 8.968 | 0.10 | | | 4.07 |
| 7 | 7.476 | 1.20 | 1.59201 | 67.0 | 4.04 |
| 8 | −6.990 | 0.10 | | | 3.87 |
| 9 | 43.381 | 0.50 | 1.75520 | 27.5 | 3.52 |
| 10* | 6.181 | (variable) | | | 3.17 |
| 11 | ∞ | 1.00 | 1.51633 | 64.1 | 10.00 |
| 12 | ∞ | | | | 10.00 |
| Image surface | ∞ | | | | |

Aspherical surface data

Second surface $\kappa = -2.53301e-001$    $A4 = 9.92721e-005$    $A6 = 5.19371e-005$
$A8 = -5.81921e-006$    $A10 = 1.07282e-007$ Third surface $\kappa = 0.00000e+000$    $A4 = 3.41177e-004$    $A6 = 1.35873e-005$
$A8 = -1.29493e-006$    $A10 = 2.37390e-008$ Fifth surface $\kappa = 0.00000e+000$    $A4 = -5.67773e-003$    $A6 = -5.52175e-004$
$A8 = -2.99405e-005$    $A10 = -6.66912e-006$ Sixth surface $\kappa = 0.00000e+000$    $A4 = -7.61783e-003$    $A6 = -5.14016e-004$ Tenth surface $\kappa = 0.00000e+000$    $A4 = 5.43558e-003$    $A6 = 4.75192e-004$ Various data
Zoom ratio 2.84

| | wide-angle | Intermediate | Telephoto |
|---|---|---|---|
| Focal length | 5.15 | 9.88 | 14.61 |
| F-number | 3.20 | 4.47 | 5.76 |
| Field angle | 36.99 | 21.44 | 14.87 |
| Image height | 3.88 | 3.88 | 3.88 |
| Total lens length | 28.14 | 25.32 | 26.97 |
| BF | 1.00 | 1.00 | 1.00 |
| d4 | 10.34 | 3.44 | 1.00 |
| d10 | 8.60 | 12.68 | 16.77 |
| Entrance pupil position | 5.31 | 3.67 | 2.69 |
| Exit pupil position | −11.10 | −15.19 | −19.27 |
| Front principal position | 8.27 | 7.52 | 6.77 |
| Rear principal position | −4.15 | −8.88 | −13.61 |

Zoom lens group data

| Group | Start Surface | Focal length | Lens length | Front principal point position | Rear principal point position |
|---|---|---|---|---|---|
| 1 | 1 | −9.28 | 4.10 | −0.20 | −3.21 |
| 2 | 5 | 8.01 | 3.10 | −0.38 | −2.21 |
| 3 | 11 | ∞ | 1.00 | 0.33 | −0.33 |

Single lens data

| Lens | Start surface | Focal length |
|---|---|---|
| 1 | 1 | −5.38 |
| 2 | 3 | 15.64 |
| 3 | 5 | 16.71 |
| 4 | 7 | 6.30 |
| 5 | 9 | −9.60 |

Numerical Embodiment 8

Unit mm

Surface data

| Surface number | r | d | nd | vd | Effective diameter |
|---|---|---|---|---|---|
| 1 | −25.066 | 1.00 | 1.86400 | 40.6 | 8.92 |
| 2* | 7.264 | 1.73 | | | 7.96 |
| 3 | 13.362 | 1.50 | 1.84666 | 23.8 | 8.26 |
| 4 | 246.836 | (variable) | | | 8.11 |
| 5* | 5.017 | 2.00 | 1.59201 | 67.0 | 4.90 |
| 6* | −9.559 | 0.23 | | | 4.67 |
| 7 | −5.388 | 1.05 | 1.66672 | 48.3 | 4.66 |
| 8 | −5.677 | 0.10 | | | 4.66 |
| 9 | 87.144 | 0.50 | 1.75520 | 27.5 | 4.22 |
| 10* | 7.543 | (variable) | | | 3.91 |
| 11 | ∞ | 1.00 | 1.51633 | 64.1 | 10.00 |
| 12 | ∞ | | | | 10.00 |
| Image surface | ∞ | | | | |

Aspherical surface data

Second surface $\kappa = -3.30479e-001$    $A4 = -2.45765e-004$    $A6 = 8.37793e-006$
$A8 = -6.65542e-007$    $A10 = 1.51995e-008$ Fifth surface $\kappa = 0.00000e+000$    $A4 = -5.61440e-004$    $A6 = -1.79268e-005$
$A8 = -4.34827e-006$    $A10 = 8.95422e-008$ Sixth surface $\kappa = 0.00000e+000$    $A4 = -7.67840e-004$    $A6 = 7.64241e-006$ Tenth surface $\kappa = 0.00000e+000$    $A4 = 2.40221e-003$    $A6 = 8.80635e-005$
$A8 = 3.31171e-006$    $A10 = 1.42656e-008$ Various data
Magnification varying ratio 2.84

| | Wide-angle | Intermediate | Telephoto |
|---|---|---|---|
| Focal length | 6.68 | 12.81 | 18.94 |
| F-number | 3.39 | 4.57 | 5.76 |
| Field angle | 30.11 | 16.83 | 11.56 |
| Image height | 3.88 | 3.88 | 3.88 |
| Total lens length | 34.98 | 30.53 | 32.19 |
| BF | 0.98 | 0.98 | 0.98 |
| d4 | 13.78 | 4.33 | 1.00 |
| d10 | 11.11 | 16.10 | 21.10 |
| Entrance pupil position | 6.52 | 4.22 | 2.84 |
| Exit pupil position | −14.07 | −19.07 | −24.06 |
| Front principal position | 10.23 | 8.84 | 7.45 |
| Rear principal position | −5.70 | −11.83 | −17.96 |

Zoom lens group data

| Group | Start Surface | Focal length | Lens length | Front principal point position | Rear principal point position |
|---|---|---|---|---|---|
| 1 | 1 | −12.72 | 4.23 | −0.97 | −4.43 |
| 2 | 5 | 10.37 | 3.88 | −0.82 | −3.07 |
| 3 | 11 | ∞ | 1.00 | 0.33 | −0.33 |

Single lens data

| Lens | Start surface | Focal length |
|---|---|---|
| 1 | 1 | −6.43 |
| 2 | 3 | 16.64 |
| 3 | 5 | 5.86 |
| 4 | 7 | 350.80 |
| 5 | 9 | −10.96 |

Numerical Embodiment 9

Unit mm

Surface data

| Surface number | r | d | nd | vd | Effective diameter |
|---|---|---|---|---|---|
| 1 | −18.465 | 1.00 | 1.85135 | 40.1 | 9.87 |
| 2* | 8.690 | 1.80 | | | 9.01 |
| 3 | 17.014 | 1.50 | 1.84666 | 23.8 | 9.39 |
| 4 | −130.205 | (variable) | | | 9.31 |
| 5* | 5.388 | 2.00 | 1.59201 | 67.0 | 5.00 |
| 6* | −9.087 | 0.30 | | | 5.00 |
| 7 | −4.695 | 0.80 | 1.51633 | 64.1 | 4.80 |
| 8 | −5.288 | 0.10 | | | 4.60 |
| 9 | 17.629 | 0.50 | 1.80486 | 24.7 | 4.04 |
| 10* | 6.292 | (variable) | | | 3.74 |
| 11 | ∞ | 1.00 | 1.51633 | 64.1 | 10.00 |
| 12 | ∞ | | | | 10.00 |
| Image surface | ∞ | | | | |

Aspherical surface data

Second surface $\kappa = 3.71092e{-}001$  $A4 = -3.62957e{-}004$  $A6 = 7.04205e{-}006$
$A8 = -5.85284e{-}007$  $A10 = 1.10575e{-}008$ Fifth surface $\kappa = 0.00000e{+}000$  $A4 = -9.28525e{-}004$  $A6 = -2.57481e{-}005$
$A8 = -1.41762e{-}005$  $A10 = 5.24145e{-}007$ Sixth surface $\kappa = 0.00000e{+}000$  $A4 = -1.26401e{-}003$  $A6 = -8.51305e{-}005$ Tenth surface $\kappa = 0.00000e{+}000$  $A4 = 1.87968e{-}003$  $A6 = 1.27564e{-}004$
$A8 = -2.86218e{-}006$  $A10 = -4.50820e{-}007$

Various data
Magnification varying ratio 2.84

| | wide-angle | Intermediate | Telephoto |
|---|---|---|---|
| Focal length | 6.68 | 12.82 | 18.95 |
| F-number | 3.31 | 4.53 | 5.76 |
| Field angle | 30.12 | 16.82 | 11.56 |
| Image height | 3.88 | 3.88 | 3.88 |
| Total lens length | 34.69 | 29.28 | 30.40 |
| BF | 0.98 | 0.98 | 0.98 |
| d4 | 13.96 | 3.86 | 0.30 |
| d10 | 10.76 | 15.44 | 20.12 |
| Entrance pupil position | 6.68 | 4.09 | 2.52 |
| Exit pupil position | −13.63 | −18.31 | −22.99 |
| Front principal position | 10.30 | 8.39 | 6.48 |
| Rear principal position | −5.70 | −11.84 | −17.97 |

Zoom lens group data

| Group | Start Surface | Focal length | Lens length | Front principal point position | Rear principal point position |
|---|---|---|---|---|---|
| 1 | 1 | −13.59 | 4.30 | −1.21 | −4.83 |
| 2 | 5 | 10.37 | 3.70 | −0.93 | −3.06 |
| 3 | 11 | ∞ | 1.00 | 0.33 | −0.33 |

Single lens data

| Lens | Start surface | Focal length |
|---|---|---|
| 1 | 1 | −6.83 |
| 2 | 3 | 17.86 |
| 3 | 5 | 6.02 |
| 4 | 7 | −150.00 |
| 5 | 9 | −12.40 |

Numerical Embodiment 10

Unit mm

Surface data

| Surface number | r | d | nd | vd | Effective diameter |
|---|---|---|---|---|---|
| 1 | −19.556 | 1.00 | 1.86400 | 40.6 | 8.95 |
| 2* | 8.264 | 1.76 | | | 8.12 |
| 3 | 15.902 | 1.50 | 1.84666 | 23.8 | 8.41 |
| 4 | −180.043 | (variable) | | | 8.28 |
| 5* | 5.605 | 2.00 | 1.55332 | 71.7 | 4.69 |
| 6* | −8.013 | 0.38 | | | 4.60 |
| 7 | −3.938 | 0.80 | 1.48749 | 70.2 | 4.55 |
| 8 | −4.360 | 0.10 | | | 4.61 |
| 9 | 23.118 | 0.50 | 1.80486 | 24.7 | 4.13 |
| 10* | 7.603 | (variable) | | | 3.86 |
| 11 | ∞ | 1.00 | 1.51633 | 64.1 | 10.00 |
| 12 | ∞ | | | | 10.00 |
| Image surface | ∞ | | | | |

Aspherical surface data

Second surface $\kappa = -1.28936e{+}000$  $A4 = -2.75567e{-}005$  $A6 = 1.10586e{-}005$
$A8 = -7.89985e{-}007$  $A10 = 1.97858e{-}008$ Fifth surface $\kappa = 0.00000e{+}000$  $A4 = -1.21065e{-}003$  $A6 = -2.98919e{-}005$
$A8 = -2.48140e{-}005$  $A10 = 1.37032e{-}006$ Sixth surface $\kappa = 0.00000e{+}000$  $A4 = -1.94032e{-}003$  $A6 = -1.16006e{-}004$ Tenth surface $\kappa = 0.00000e{+}000$  $A4 = 2.05376e{-}003$  $A6 = 9.54232e{-}005$
$A8 = -2.57044e{-}008$  $A10 = -8.48801e{-}007$

Various data
Magnification varying ratio 2.84

| | wide-angle | Intermediate | Telephoto |
|---|---|---|---|
| Focal length | 6.68 | 12.81 | 18.94 |
| F-number | 3.45 | 4.60 | 5.76 |
| Field angle | 30.12 | 16.83 | 11.56 |
| Image height | 3.88 | 3.88 | 3.88 |
| Total lens length | 34.61 | 29.70 | 31.11 |
| BF | 0.98 | 0.98 | 0.98 |
| d4 | 13.50 | 3.74 | 0.30 |
| d10 | 11.10 | 15.94 | 20.79 |
| Entrance pupil position | 6.49 | 4.00 | 2.48 |
| Exit pupil position | −14.17 | −19.02 | −23.86 |
| Front principal point position | 10.23 | 8.60 | 6.98 |
| Rear principal point position | −5.70 | −11.83 | −17.96 |

Zoom lens group data

| Group | Start Surface | Focal length | Lens length | Front principal point position | Rear principal point position |
|---|---|---|---|---|---|
| 1 | 1 | −13.13 | 4.26 | −1.13 | −4.68 |
| 2 | 5 | 10.38 | 3.78 | −0.54 | −2.92 |
| 3 | 11 | ∞ | 1.00 | 0.33 | −0.33 |

Single lens data

| Lens | Start surface | Focal length |
|---|---|---|
| 1 | 1 | −6.61 |
| 2 | 3 | 17.32 |
| 3 | 5 | 6.29 |
| 4 | 7 | −220.00 |
| 5 | 9 | −14.28 |

TABLE 1

| CONDITIONAL EXPRESSION | LOWER LIMIT | UPPER LIMIT | EMBODIMENT | | | | |
|---|---|---|---|---|---|---|---|
| | | | 1 | 2 | 3 | 4 | 5 |
| (1) | −24.0 | −1.0 | −6.64 | −3.23 | −15.35 | −11.70 | −5.85 |
| (2) | 0.2 | 2.2 | 1.34 | 1.78 | 0.46 | 0.94 | 0.94 |
| (3) | 1.2 | 1.8 | 1.50 | 1.51 | 1.46 | 1.47 | 1.46 |
| (4) | 0.2 | 1.2 | 0.71 | 0.54 | 0.87 | 0.84 | 0.68 |
| (5) | −7.0 | −1.0 | −3.30 | −4.40 | −4.59 | −4.85 | −4.36 |
| (6) | 0.3 | 1.5 | 0.82 | 0.96 | 0.54 | 0.65 | 0.66 |
| (7) | 1.0 | 1.8 | 1.32 | 1.52 | 1.43 | 1.44 | 1.39 |
| (8) | 1.6 | 2.5 | 1.99 | 2.30 | 2.09 | 2.12 | 2.03 |

| CONDITIONAL EXPRESSION | LOWER LIMIT | UPPER LIMIT | EMBODIMENT | | | | |
|---|---|---|---|---|---|---|---|
| | | | 6 | 7 | 8 | 9 | 10 |
| (1) | −24.0 | −1.0 | −7.85 | −23.90 | −3.75 | −2.76 | −2.93 |
| (2) | 0.2 | 2.2 | 0.75 | 1.33 | 1.19 | 2.11 | 1.98 |
| (3) | 1.2 | 1.8 | 1.57 | 1.56 | 1.55 | 1.55 | 1.55 |
| (4) | 0.2 | 1.2 | 0.77 | 0.92 | 0.55 | 0.36 | 0.41 |
| (5) | −7.0 | −1.0 | −1.85 | −2.72 | −3.38 | −3.09 | −3.16 |
| (6) | 0.3 | 1.5 | 0.75 | 1.20 | 1.06 | 1.20 | 1.38 |
| (7) | 1.0 | 1.8 | 1.27 | 1.16 | 1.23 | 1.31 | 1.26 |
| (8) | 1.6 | 2.5 | 2.00 | 1.80 | 1.90 | 2.03 | 1.96 |

Next, an embodiment of a digital camera (an image pickup apparatus) in which the zoom lens as shown in each embodiment is used as an image pickup optical system will be described with reference to FIG. 21.

In FIG. 21, reference numeral 20 denotes a camera body, and reference numeral 21 denotes an image pickup optical system which is constituted by the zoom lens of the present invention. Reference numeral 22 denotes an image pickup element such as a CCD which receives light of an object image formed by the image pickup optical system 21. Reference numeral 23 denotes a recorder which records the object image received by the image pickup element 22, and reference numeral 24 denotes a finder for observing the object image which is displayed on a display element (not shown).

The display element is constituted by a liquid crystal panel or the like, and an object image formed on the image pickup element 22 is displayed.

Thus, a zoom lens of the present invention is applied to a digital camera to realize an image pickup apparatus having a high optical performance.

This application claims the benefits of Japanese Patent Application No. 2009-114059, filed on May 9, 2009, and Japanese Patent Application No. 2010-035248, filed on Feb. 19, 2010, which are hereby incorporated by reference herein in their entirety.

What is claimed is:

1. A zoom lens comprising:
a first lens group having a negative refractive power; and
a second lens group having a positive refractive power in order from an object side to an image side,
wherein an interval between the first lens group and the second lens group is configured to be changed in a zoom operation,
wherein the first lens group comprises a negative lens and a positive lens in order from the object side to the image side,
wherein the negative lens and the positive lens of the first lens group are arranged at intervals,
wherein the second lens group comprises three lenses including a positive lens and a negative lens having a maximum refractive power in order from the object side to the image side, and
wherein the following conditional expressions are satisfied:

$$-24.0 < R1na/fw < -1.0$$

$$0.2 < (R2na+R2nb)/(R2na-R2nb) < 2.2$$

$$1.2 < f2/fw < 1.8,$$

where $R1na$ is a radius of curvature of a lens surface at the object side of the negative lens of the first lens group, $R2na$ is a radius of curvature of a lens surface at the object side of the negative lens having the maximum refractive power of the second lens group, $R2nb$ is a radius of curvature of a lens surface at the image side of the negative lens having the maximum refractive power of the second lens group, $f2$ is a focal length of the second lens group, and $fw$ is a focal length at a wide-angle end of the zoom lens,
wherein the number of the lens group included in the zoom lens consists of only two lens group, the first lens group and the second lens group.

* * * * *